(12) United States Patent
Osborn et al.

(10) Patent No.: US 11,584,545 B2
(45) Date of Patent: Feb. 21, 2023

(54) PORTABLE ELECTRO-OPTICAL/INFRARED TURRET SYSTEMS AND METHODS FOR USING THE SAME

(71) Applicant: L-3 Communications Integrated Systems L.P., Greenville, TX (US)

(72) Inventors: Roy M. Osborn, Alba, TX (US); Timothy W. Troup, Nevada, TX (US); Thomas J. Fontenot, Rockwall, TX (US); Andrew S. Martin, Greenville, TX (US); Beelie E. Biehler, Royse City, TX (US)

(73) Assignee: L3Harris Technologies Integrated Systems L.P., Melbourne, FL (US)

( * ) Notice: Subject to any disclaimer, the term of this patent is extended or adjusted under 35 U.S.C. 154(b) by 436 days.

(21) Appl. No.: 16/723,043

(22) Filed: Dec. 20, 2019

(65) Prior Publication Data
US 2021/0341333 A1    Nov. 4, 2021

(51) Int. Cl.
*B64D 47/08*    (2006.01)
*B64D 7/00*    (2006.01)

(52) U.S. Cl.
CPC ............... *B64D 47/08* (2013.01); *B64D 7/00* (2013.01)

(58) Field of Classification Search
USPC ......................................................... 396/12
See application file for complete search history.

(56) References Cited

U.S. PATENT DOCUMENTS

| | | | | |
|---|---|---|---|---|
| 2,415,563 A | * | 2/1947 | Nash ...................... | G03B 15/00 318/674 |
| 2,506,095 A | * | 5/1950 | Mantz .................. | G03B 17/561 188/306 |
| 4,218,702 A | * | 8/1980 | Brocard ................. | B64D 47/08 200/6 A |
| 5,426,476 A | * | 6/1995 | Fussell ................. | H04N 5/2252 348/E5.026 |
| 6,286,806 B1 | * | 9/2001 | Corcoran ............... | F16M 11/10 248/519 |

(Continued)

FOREIGN PATENT DOCUMENTS

WO    WO-2018214162 A1 *    11/2018    ............. B64D 47/08

OTHER PUBLICATIONS

Aircraft Extrusion Company, "Aerospace Seat Track and Cargo Track", retrieved from Internet Dec. 17, 2019, 5 pages.

(Continued)

*Primary Examiner* — Rodney E Fuller
(74) *Attorney, Agent, or Firm* — Egan, Enders & Huston LLP.

(57) ABSTRACT

Portable EO/IR turret systems and methods of using the same are provided. The portable EO/IR turret systems may be installed and used on a variety of different types of stationary and mobile platforms, and may be optionally self-contained and self-powered. The portable EO/IR turret systems may also be configured and dimensioned as fully operational EO/IR turrets that are contained within a carry-on package or other type of portable chassis that may be temporarily placed and used on a first host platform, and then optionally moved and re-used on a second and different host platform, and further optionally with no required modification/s to either the first or second host platform.

36 Claims, 17 Drawing Sheets

(56) References Cited

U.S. PATENT DOCUMENTS

| | | | | |
|---|---|---|---|---|
| 6,424,804 | B1* | 7/2002 | Johnson | B64D 47/08 |
| | | | | 396/12 |
| 7,387,276 | B1* | 6/2008 | Smith | B64C 1/1415 |
| | | | | 244/129.1 |
| 8,434,950 | B1* | 5/2013 | Wawro | G03B 17/561 |
| | | | | 396/419 |
| 9,669,927 | B2 | 6/2017 | Hodge et al. | |
| 9,676,482 | B2 | 6/2017 | Hodge et al. | |
| 10,202,193 | B2 | 2/2019 | Hodge et al. | |
| 10,969,256 | B2* | 4/2021 | Parsons | B64D 43/00 |
| 2002/0081110 | A1* | 6/2002 | Johnson | G03B 15/006 |
| | | | | 396/12 |
| 2012/0025021 | A1* | 2/2012 | Jorgensen | B64D 47/08 |
| | | | | 244/129.4 |
| 2014/0077034 | A1* | 3/2014 | Woodland | B64D 1/02 |
| | | | | 244/122 R |
| 2018/0037172 | A1* | 2/2018 | Nelson | F16M 11/2092 |
| 2020/0025596 | A1* | 1/2020 | Parsons | G01D 11/245 |
| 2021/0132477 | A1* | 5/2021 | Holland | G03B 17/565 |

OTHER PUBLICATIONS

Flir Systems Inc, "Star SAFIRE 380-HDc", Jan. 14, 2019, 2 pages.
Flir Systems Inc, "Star SAFIRE 380-HDc,", retrieved from Internet Nov. 15, 2019, 1 page.
Flir Systems Inc, "Star SAFIRE 380-HLD", Jan. 14, 2019, 2 pages.
Flir Systems Inc, "Star SAFIRE 380-HLD", retrieved from Internet Nov. 15, 2019, 1 page.
www.pelican.com, "MAC Rack 12U", retrieved from internet Nov. 15, 2019, 2 pages.
Peli Products, "MR1917—Feb. 25, 2005", 2017, 1 page.
www.apdistributor.com, "MR1923—Feb. 25, 2005", retrieved from Internet Nov. 15, 2019; 4 pages.
Peli Products, "MR1923—Feb. 25, 2005", 2017, 1 page.
L3harris, "WESCAM MX-8", 2019, 1 page.
L3harris, "WESCAM MX-10", 2019, 1 page.
L3harris, "WESCAM MX-15", 2019, 1 page.
L3harris, "WESCAM MX-8 Mission & Platforms", 2019, 1 page.
L3harris, "WESCAM MX-10 Mission & Platforms", 2019, 1 page.
L3harris, "WESCAM MX-15 Mission & Platforms", 2019, 1 page.

* cited by examiner

PORTABLE ELECTRO-OPTICAL/INFRARED TURRET SYSTEMS AND METHODS FOR USING THE SAME

FIELD

This invention relates generally to EO/IR turrets and, more particularly, to portable EO/IR turret systems and methods of using the same.

BACKGROUND

Airborne electro-optical/infrared (EO/IR) turret products are very expensive, and also require the expense of aircraft modification and permanent installation of an EO/IR turret on an aircraft to allow for inflight use.

SUMMARY

Disclosed herein are portable EO/IR turret systems and methods of using the same. The portable EO/IR turret systems may be installed and used on a variety of different types of stationary and mobile platforms, e.g., without any modification to the host platform and/or without requiring a FAA supplemental type certificate (STC). In one embodiment, a portable EO/IR turret system may be provided that is optionally self-contained and self-powered (i.e., including its own power source) and configured and dimensioned as a fully operational EO/IR turret contained within a carry-on package or other type of portable chassis that may be temporarily placed and used on a first host platform, and then optionally moved and re-used on a second and different host platform with no required modification/s to either the first or second host platform. In this regard, a portable chassis containing a portable EO/IR turret may be positioned on any suitable existing surface of a host platform (e.g., such as floor of a passenger cabin, cargo area or luggage area of an aircraft) in a position that affords the EO/IR turret a desired field of view from the host platform to a scene or target that is separate from the host platform itself. Such a position may be, for example, adjacent a viewable opening (e.g., window opening, door opening, hatch opening etc.) defined within an aircraft fuselage or an opening defined in the body or wall of any other type of vehicle or building.

In some embodiments, no permanent installation work and/or permanent mounting equipment is required to deploy and operate the disclosed EO/IR turrets on a host platform. In such embodiments, the disclosed EO/IR turret systems may be employed for applications where it is too costly to deploy a conventional EO/IR turret due to the required permanent installation and mounting costs for such conventional EO/IR turrets. Examples of different applications for which the disclosed portable EO/IR turret systems may be employed include, but are not limited to, forest service surveillance operations, law enforcement and military intelligence/surveillance/reconnaissance operations, search and rescue operations, harbor and border customs inspections, filming platform for airborne news media and film production operations, long distance ground surveillance, etc.

In one embodiment, the disclosed portable EO/IR turret systems may be host platform agnostic. In such an embodiment, examples of types of host platforms on which the disclosed portable EO/IR turret systems may be deployed include, but are not limited to, mobile platforms such as airborne platforms (e.g., fixed-wing aircraft, rotary aircraft, etc.), seaborne platforms (e.g., ships, submarines, etc.), ground vehicle platforms (e.g., trucks, automobiles, all terrain vehicles "ATVs", etc.). The disclosed portable EO/IR turret systems may also be installed and used on stationary platforms such as buildings, fire towers, control towers, etc. Advantageously, the same portable EO/IR turret system components may also be temporarily installed, used, and moved between different types of platforms, and between mobile and stationary platforms.

In one exemplary embodiment, a portable EO/IR turret may be installed and operated on a host platform to obtain EO/IR surveillance or observation data (e.g., video or other type of EO/IR data) from any portion of an observed area that falls within the line of sight of one or more sensor/s of the portable EO/IR turret. Besides sensors, a portable EO/IR turret may additionally or alternatively include energy emitter/s. Examples of types of EO/IR sensors and energy emitters that may be implemented, alone or in any combination, with the disclosed portable EO/IR turrets include, but are not limited to, visible spectrum sensors (e.g., including video or still photo), infrared spectrum sensors, laser energy emitters, etc. In one embodiment, a portable EO/IR turret may be configured to accept multiple different types of interchangeable sensors and emitters, allowing the EO/IR turret to not only be moved between different host platforms and types of host platforms, but also to be reconfigured for different missions by interchanging different sensors and/or emitters for use during different missions.

In one embodiment, a portable EO/IR turret system may be deployed as a self-contained unit that is used to collect sensor data and/or to emit energy from a host platform without requiring any electrical (e.g., data or control signal) interface to any electrical circuitry (such as power circuitry, data processing circuitry, control signal circuitry, etc.) of a host platform. In one embodiment, a portable EO/IR turret system may include a portable hand controller and/or portable graphics display that may be carried on and temporarily installed together with a chassis that houses the EO/IR turret, and used to allow a local human operator to view sensor data and/or control operation of the EO/IR turret, e.g., without requiring any electrical circuitry that is permanently mounted to, or otherwise a component of, the host platform. In one embodiment, a portable EO/IR turret system may additionally or alternatively include a wired or wireless network interface, e.g., to allow the EO/IR turret system to be locally monitored and controlled (e.g., from a notebook computer, tablet computer, smartphone, etc.) and/or monitored and controlled from a remotely located computer (e.g., via the Internet or a corporate or government intranet). For example, sensor data gathered by the EO/IR turret system may be transmitted and/or downloaded via wireless network or Ethernet connection to a remote location (e.g., to circuitry deployed on another platform, building or vehicle).

In one respect, disclosed herein is a system, including: a portable chassis; and an electro-optical/infrared (EO/IR) turret supported by the portable chassis. The EO/IR turret may include: at least one EO/IR sensor or at least one energy emitter rotating about at least one gimbal axis relative to the portable chassis, and at least one actuator driving rotation of the at least one EO/IR sensor or at least one energy emitter about the at least one gimbal axis. The system may also include: at least one wired or wireless signal output from the portable chassis, the signal output communicating data from the at least one EO/IR sensor or at least one energy emitter; and a portable power source providing power to operate power-consuming circuitry of the portable chassis that includes at least one of the EO/IR sensor, the energy emitter and/or the actuator. The portable chassis and portable power source may be moveable onto and off a separate host platform while at the same time the portable chassis is supporting the EO/IR turret.

In another respect, disclosed herein is a method, including: positioning a portable chassis together with an electro-optical/infrared (EO/IR) turret on a host platform that is separate from the portable chassis, with the portable chassis at the same time supporting the EO/IR turret. The turret may include: at least one EO/IR sensor or at least one energy emitter rotating about at least one gimbal axis relative to the portable chassis, and at least one actuator driving rotation of the at least one EO/IR sensor or at least one energy emitter about the at least one gimbal axis. The method may further include: positioning a portable power source on the host platform and providing power from the portable power source to operate power-consuming circuitry of the portable chassis that includes at least one of the EO/IR sensor, the energy emitter and/or the actuator; and providing at least one wired or wireless output signal from the portable chassis while the portable chassis is positioned with the EO/IR turret on the host platform, the output signal communicating data from the at least one EO/IR sensor or the at least one energy emitter while the portable chassis is positioned with the EO/IR turret on the second host platform. The portable chassis and power source may be movable onto and off the host platform while at the same time the portable chassis is supporting the EO/IR turret.

In another respect, disclosed herein is a system, including: a host platform having an interior space defined within the host platform; a portable chassis positioned within the interior space of the host platform; and an electro-optical/infrared (EO/IR) turret supported by the portable chassis. The EO/IR turret may include: at least one EO/IR sensor or at least one energy emitter rotating about at least one gimbal axis relative to the portable chassis, and at least one actuator driving rotation of the at least one EO/IR sensor or at least one energy emitter about the at least one gimbal axis. The system may further include at least one wired or wireless signal output from the portable chassis, the signal output communicating data from the at least one EO/IR sensor or at least one energy emitter.

In another respect, disclosed herein is a method, including: positioning a portable chassis together with an electro-optical/infrared (EO/IR) turret within an interior space defined within a host platform that is separate from the portable chassis, the portable chassis supporting the EO/IR turret, and the EO/IR turret including: at least one EO/IR sensor or at least one energy emitter rotating about at least one gimbal axis relative to the portable chassis, and at least one actuator driving rotation of the at least one EO/IR sensor or at least one energy emitter about the at least one gimbal axis. The method may further include providing at least one wired or wireless output signal from the portable chassis while the portable chassis is positioned with the EO/IR turret within the interior space of the host platform, the output signal communicating data from the at least one EO/IR sensor or the at least one energy emitter while the portable chassis is positioned with the EO/IR turret within the interior space of the host platform; and the portable chassis may be movable onto and off the host platform while at the same time the portable chassis is supporting the EO/IR turret.

DESCRIPTION OF ILLUSTRATIVE
EMBODIMENTS

Figure 1:
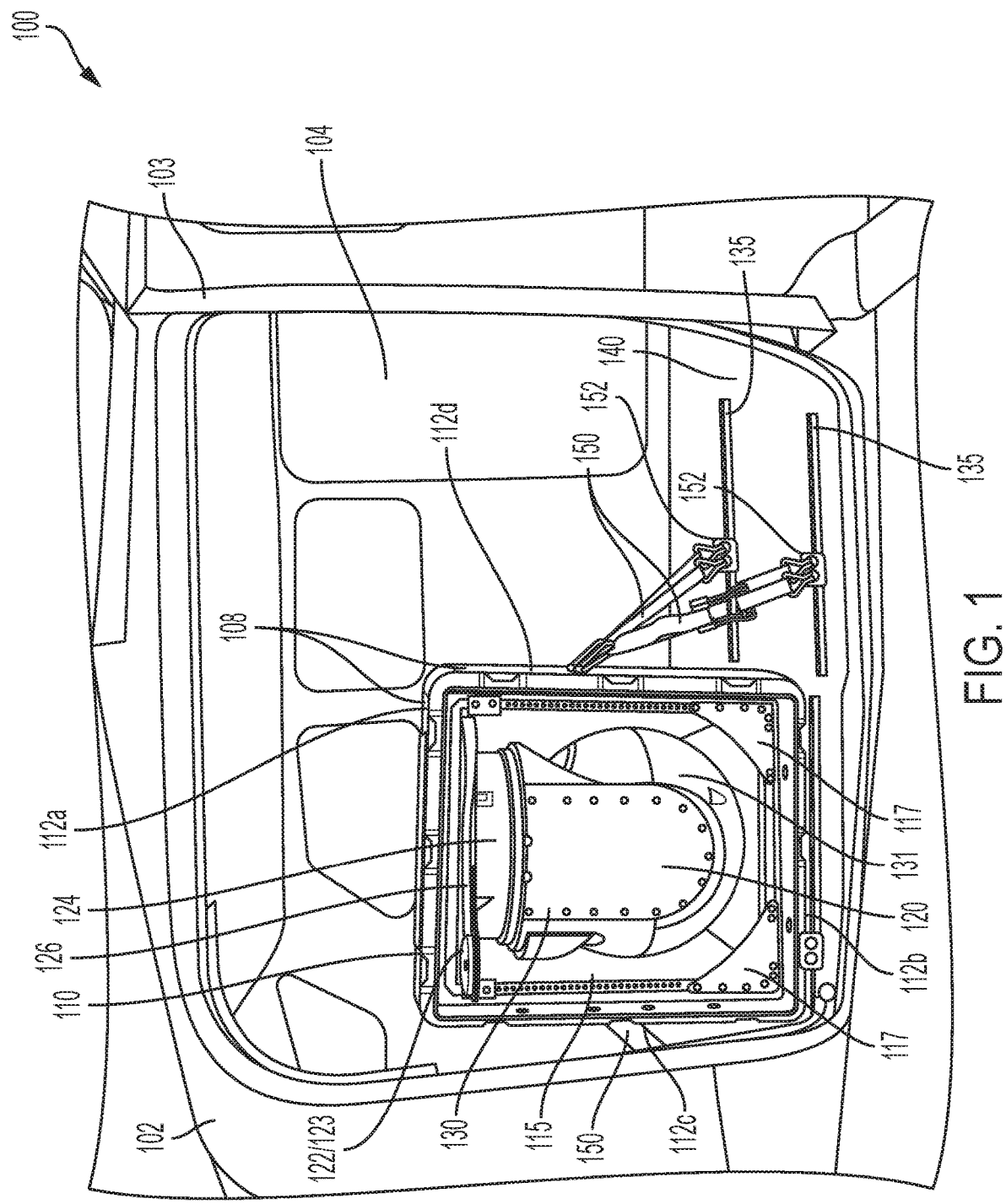
FIG. 1 illustrates a front perspective view of a portable EO/IR turret system deployed on a mobile host platform according to one exemplary embodiment of the disclosed systems and methods.
Figure 2:
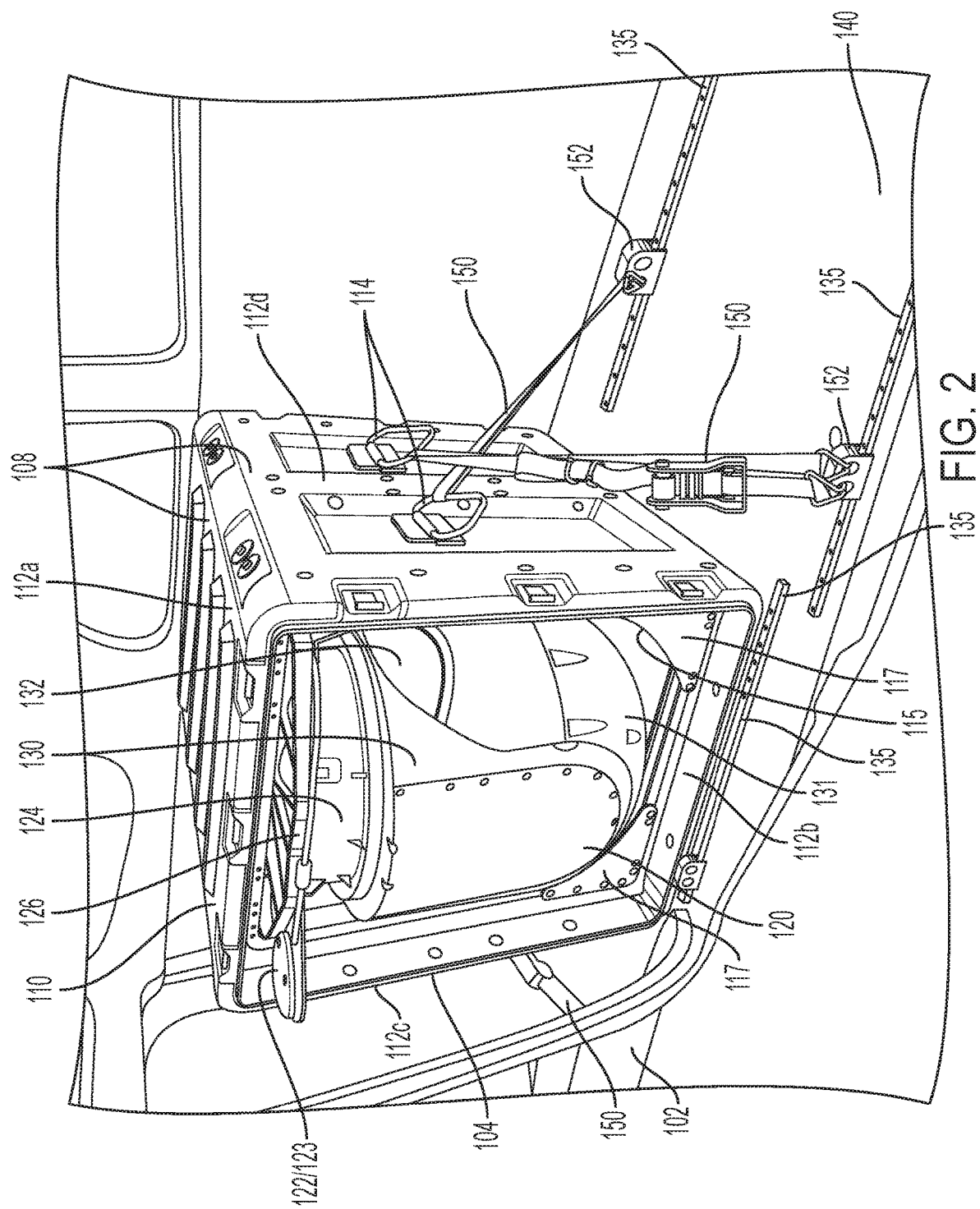
FIG. 2 illustrates a front perspective view of a portable EO/IR turret system deployed on a mobile host platform according to one exemplary embodiment of the disclosed systems and methods.

FIGS. 1 and 2 illustrate two different front perspective views of a portable EO/IR turret system 110 deployed on a mobile host platform in the form of a fixed wing aircraft 100 according to one exemplary embodiment of the disclosed systems and methods. In this embodiment, portable EO/IR turret system 110 includes an EO/IR turret 130 supported by a portable chassis 108 (portable chassis 108 and EO/IR turret 130 are further illustrated and described in relation to FIGS. 3 and 4). As shown in FIG. 1, enclosure sidewalls 112a, 112b, 112c and 112d enclose EO/IR turret 130 as a self-contained system 110 that is deployed within an interior space that is defined within fuselage 102 of aircraft 100 adjacent an open door opening 104 that is defined within a side wall of fuselage 102 of aircraft 100 to provide an off-platform field of view of a scene or target that is outside (and separate from) fuselage 102.

In the illustrated embodiment of FIGS. 1 and 2, EO/IR turret 130 is shown deployed within an interior space that is a combination passenger cabin, cargo and luggage area defined within fuselage 102 of aircraft 100, e.g., seat or cargo tracks 135 (e.g., airline track or L-Track) are provided to allow one or more passenger seats, cargo and/or luggage to be secured within the same interior space. However, it will be understood that a portable EO/IR turret system 110 may be deployed within any other type of host platform interior space that is suitably shaped and sized to accept and operatively support an EO/IR turret system 110. Examples of such suitable interior spaces include, but are not limited to, a dedicated passenger cabin area or a dedicated cargo hold area of an aircraft that has separate passenger cabin and cargo hold areas, a dedicated passenger cabin area of an aircraft having only a passenger cabin (besides the cockpit), a dedicated cargo hold area of an aircraft that only has a cargo hold area (besides the cockpit), etc.

Figure 18:
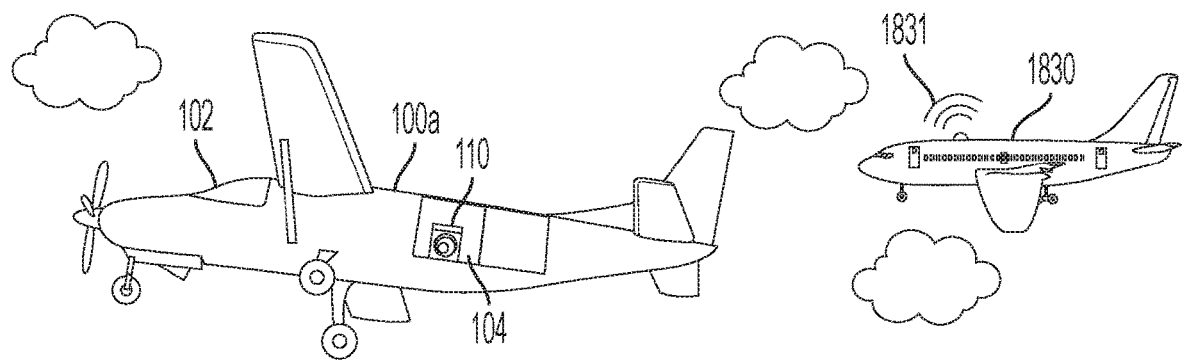
FIG. 18 illustrates an underside perspective view of a portable EO/IR turret system deployed on an airborne single engine fixed wing aircraft (Cessna 208 Caravan) according to one exemplary embodiment of the disclosed systems and methods.
Figure 19:
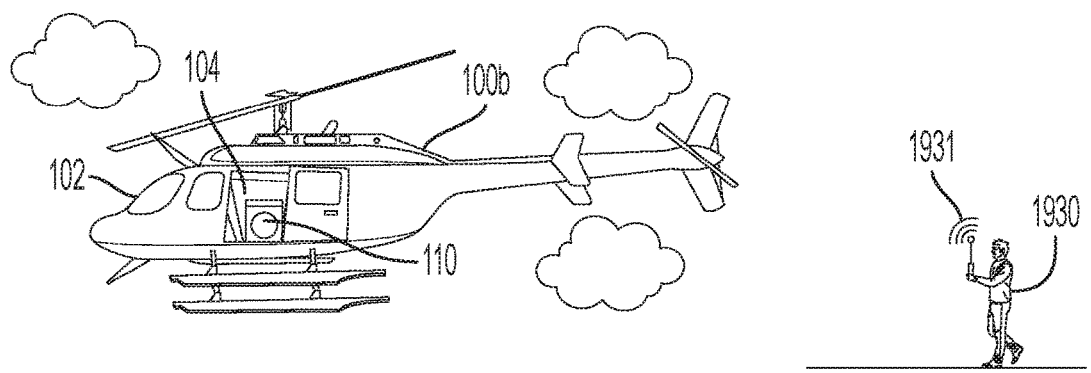
FIG. 19 illustrates an underside perspective view of a portable EO/IR turret system deployed on an airborne rotary aircraft (Bell 206 JetRanger) according to one exemplary embodiment of the disclosed systems and methods.
Figure 20:
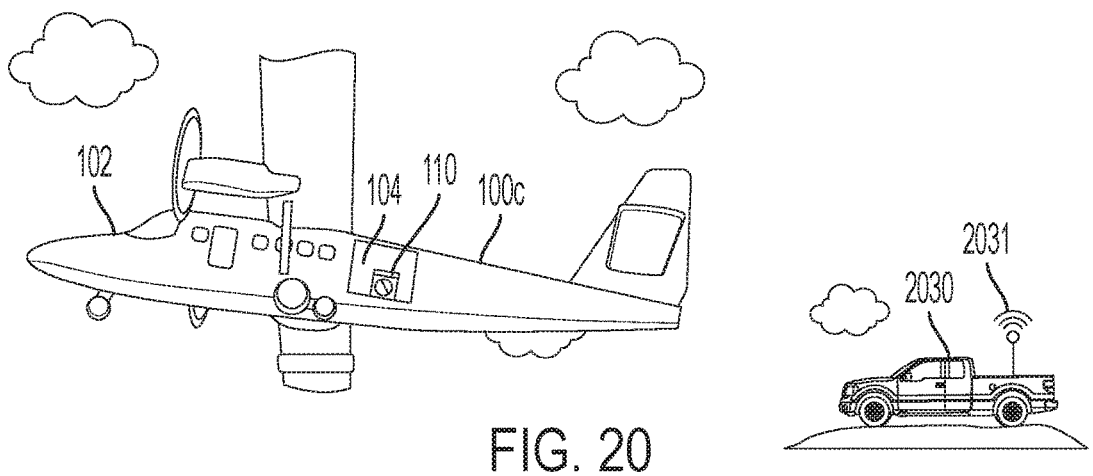
FIG. 20 illustrates an underside perspective view of a portable EO/IR turret system deployed on an airborne multiple engine fixed wing aircraft (De Havilland DHC-6 Twin Otter) according to one exemplary embodiment of the disclosed systems and methods.

For other types of host platforms, portable EO/IR turret system 110 may be deployed at any location that offers an acceptable off-platform field of view for the current mission for sensors and/or emitters of (e.g., within) portable EO/IR system 110, e.g., such as on the bridge of a seaborne ship, on a cargo platform or seat of an all-terrain vehicle (ATV), or even on the ground (in which case no host platform is required as long as an acceptable field of view for the current mission is provided for sensors and/or emitters within portable EO/IR system 110). In FIGS. 1 and 2, portable EO/IR turret system 110 is resting on a floor surface 140 of the combination passenger cabin, cargo and luggage area of aircraft 100 adjacent open door opening 104 to afford EO/IR turret 130 an open field of view through open door opening 104 to the environment outside aircraft fuselage 102, e.g., as illustrated in FIGS. 18-20. It will be understood that an off-platform field of view of a scene or target may in some alternate embodiments be through an energy-transmissive medium (e.g., such as a closed transparent window of glass, Plexiglas, polycarbonate, etc.) that is capable of transmitting energy to a sensor of portable EO/IR turret system 110, and/or energy from an emitter of portable EO/IR turret system 110.

Still referring to FIGS. 1 and 2, portable EO/IR turret system 110 is temporarily secured in this embodiment to floor surface 140 of aircraft 100 by cargo straps 150 (e.g., tie down straps, ratchet straps, etc.) that are mechanically coupled (e.g., using hooks) between integral side tie-down handles 114 of portable EO/IR turret system 110 and tie-down lugs 152 provided on aircraft floor surface 140. As shown, tie-down lugs 152 may be mechanically secured to existing conventional seat or cargo tracks 135 that are already present on or within the floor surface 140 of aircraft 100, although a metal or other rigid base plate or other structure may be optionally coupled to the floor surface 140 of aircraft 100 (e.g., via threaded fasteners or existing seat or cargo tracks) for mechanically coupling portable EO/IR turret system 110 to the floor surface 140 when existing seat or cargo tracks are not present or are present but not positioned correctly for securing portable EO/IR turret system in the correct or desired position within aircraft 100.

In either case, the chassis 108 of portable EO/IR turret system 110 may be shaped and dimensioned fit through (and be loaded onboard aircraft 100 through opening 104) or other suitable fuselage opening (e.g., by human operators using side handles 114), and then securely coupled together with its internal turret 130 to the floor 140 of aircraft 100. A mission may then be flown by aircraft 100, during which turret 130 may be operated to gather sensor data and/or emit energy through open door opening 104, e.g., in a manner described elsewhere herein. After completion of the mission, tide down straps 150 may be released, and portable EO/IR turret system 110 may be removed from aircraft 100 through door opening 104 or other suitable fuselage opening, after which portable EO/IR turret system 110 may be optionally deployed on another stationary or mobile platform. It will be understood that in some embodiments, chassis 108 of a portable EO/IR turret system 110 may be loaded onboard an aircraft 100 or other type of enclosed platform through a first opening that is different than a second opening (or closed window) through which the turret is operated on the platform during a mission to gather sensor data and/or emit energy, in which case the second opening may in some cases be dimensioned and/or shaped such that the chassis 108 will not fit through the second opening.

It will be understood that door 103 of FIGS. 1 and 2 may be optionally closed during flight at times (e.g., such as during aircraft takeoffs and landings) that portable EO/IR turret system 110 is not gathering sensor data or emitting energy. In such a case, sliding door 103 may only be slid open during flight when portable EO/IR turret system 110 is to be operated to gather sensor data and/or emit energy. In other embodiments, a door 103 may include an optional energy-transmissive window positioned to provide an off-platform field of view to the sensor/s and/or emitter/s of portable EO/IR turret system 110, in which case door 103 may remain closed during flight while portable EO/IR turret system 110 is gathering sensor data or emitting energy through the transmissive window of the door 103. It will also be understood that the illustrated combination of tie-down straps 150, tie-down lugs 152 and side handles 114 is exemplary only, and that any other configuration and/or type of mechanism/s and/or technique/s may be employed to temporarily secure portable EO/IR turret system 110 within an interior space defined inside fuselage 102 of aircraft 100, e.g., including removable fasteners such as nuts or bolts, etc.

Figure 3:
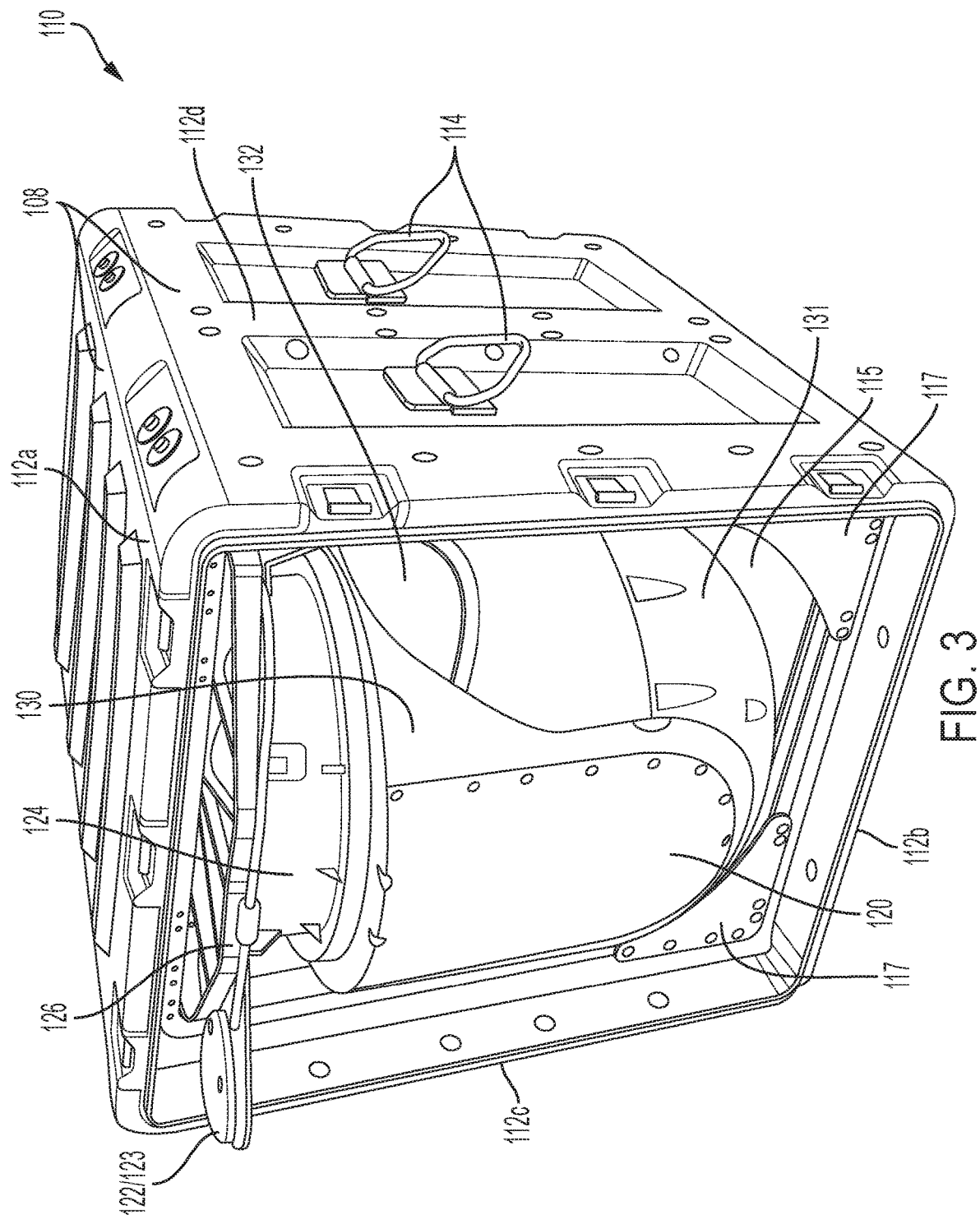
FIG. 3 illustrates a front perspective view of a portable EO/IR turret system according to one exemplary embodiment of the disclosed systems and methods.
Figure 4:
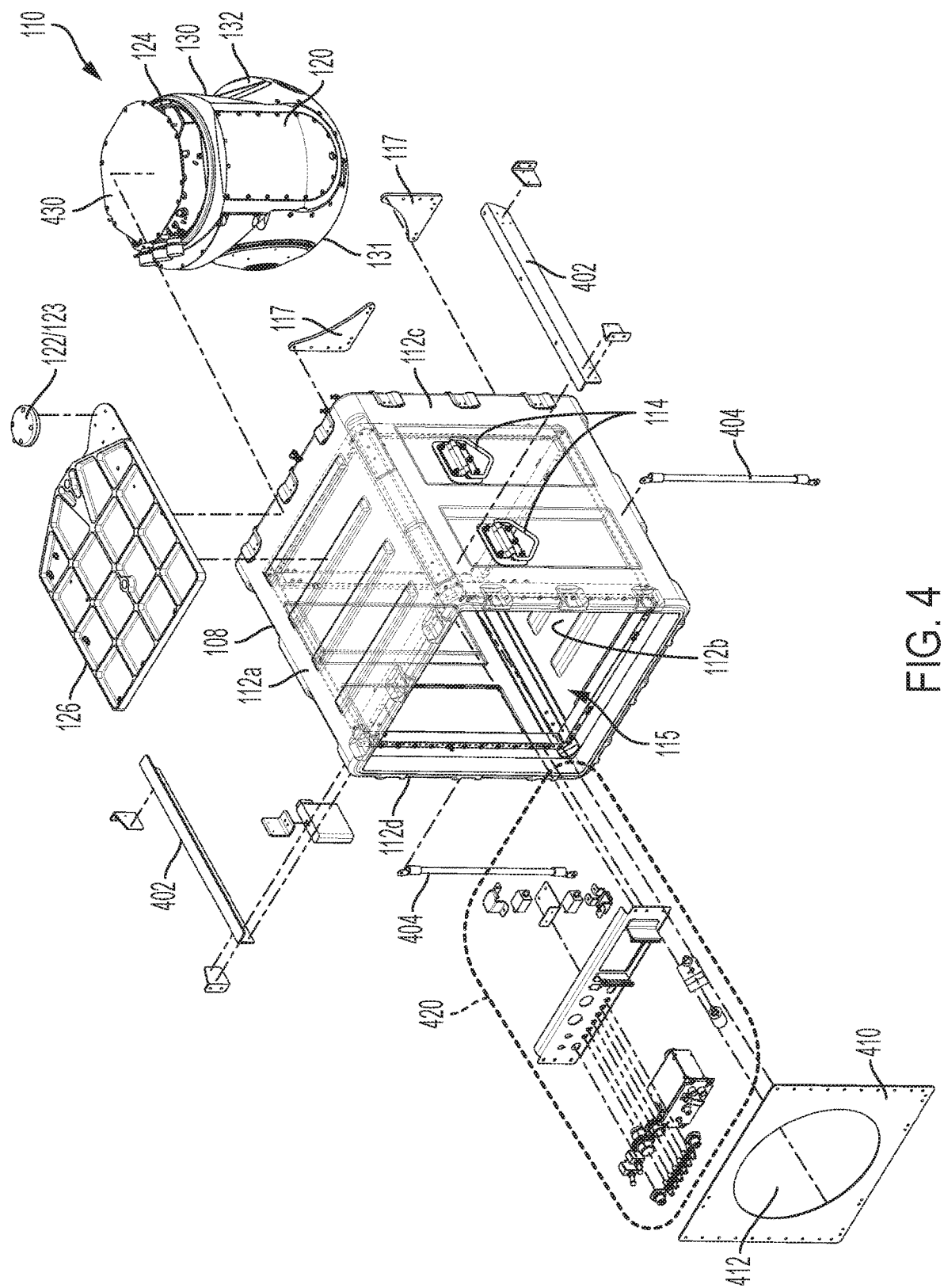
FIG. 4 illustrates an exploded perspective view of an EO/IR turret system according to one exemplary embodiment of the disclosed systems and methods.

FIG. 3 illustrates a front perspective view of the EO/IR turret system 100 of FIGS. 1 and 2 as it may be transported between platforms or when it is otherwise not deployed on a stationary or mobile platform. FIG. 4 illustrates an exploded perspective view of the EO/IR turret system 100 of FIG. 3. In the embodiment of FIGS. 3 and 4, chassis 108 is provided as a chassis enclosure defining an internal area 115 for containing EO/IR turret 130 with its turret ball 131 between top and bottom side walls 112a and 112b, and respective left and right side walls 112c and 112d, of the chassis enclosure. In such an embodiment, chassis 108 may be, for example, a transport case modified as an enclosure with open front and back ends as shown.

Examples of suitable types of transport cases that may be so modified include, but are not limited to, a Model No. MR1923-02/25/05 transport case (outside dimensions of 33.6 inches length×22.6 inches width×25.4 inches height and inside dimensions of 20 inches length×19 inches width×21 inches height), or a Model No. MR1917-02/25/05 (outside dimensions of 33.6 inches length×22.6 inches width×20.2 inches height and inside dimensions of 20 inches length×19 inches width×15.75 inches height) transport case available from Pelican Products, Inc. of Torrance, Calif. For a given application, it will be understood that outside dimensions of a chassis 108 may be selected as needed to allow chassis 108 to fit through (be smaller than) a selected opening of a selected host platform (such as door opening 104 of aircraft 100), and to fit inside an interior space of a host platform (such as interior of fuselage 102 of aircraft 100). Further, inside dimension of a chassis 108 may be selected as needed to accommodate the outer dimensions of a selected EO/IR turret 130 (e.g., such as those outer dimensions for exemplary EO/IR turrets provided below).

However, in other embodiments a chassis 108 may be any other suitable enclosed or open structure for supporting an EO/IR turret 130 in operational position on or within a host platform such as an aircraft or other type platform described herein. In this regard, it is not necessary that a chassis 108 be enclosed on one or more sides, but rather may be constructed all or in part as an open structural frame with one or more open sides (e.g., including open frame members in the form of round or square tubing that are composed of a sufficiently strong material such as aluminum, steel, or other metal).

A mounting plate 126 is provided for mechanical attachment (e.g., by threaded mechanical fasteners, rivets, welds, etc.) between an upper mounting surface 430 of EO/IR turret 130 and the interior (lower) surface of the top side 112a of chassis 108 to support and suspend EO/IR turret 130 from top side 112a as shown in FIG. 3 so that it may freely rotate about the gimbal axes of its respective electrically-powered gimbal mechanisms 120 and 124, e.g., one axis extending thorough gimbal mechanism 124 perpendicular to the plane of top side 112a, and with one axis extending between arms of gimbal mechanism 120 parallel to the plane of top side 112a. Mounting plate 126 may also hold radio frequency (RF) antenna/s 122 and/or 123 and their respective antenna element/s, as well as wire routing provisions for same. An optically-transparent and/or electromagnetically-transparent window 132 may be provided on at least a portion of the ball of turret 130 to allow incoming and/or outgoing electromagnetic and/or other types of energy to be received by a sensor disposed within turret ball 131 or emitted by an emitter disposed within turret ball 131. Examples of EO/IR turrets include, but are not limited to, MX-8 (dimensions of 8.3 inches depth×10.3 inches height), MX-10 (dimension of 10.24 inches depth×13.98 inches height), MX-15DIA (dimensions of 15.5 inches depth×18.95 inches height), and MX-15DID (dimensions of 15.5 inches depth×18.95 inches height) turrets available from L3 Harris Wescam of Burlington, Ontario, Canada; and FLIR-380 HDC (dimensions of 15.0 inches diameter×13.9 inches height) and FLIR-380 HLD (dimensions of 15.5 inches diameter×18.5 inches height) turrets available from FLIR Systems, Inc. of Wilsonville, Oreg.

Figure 16:
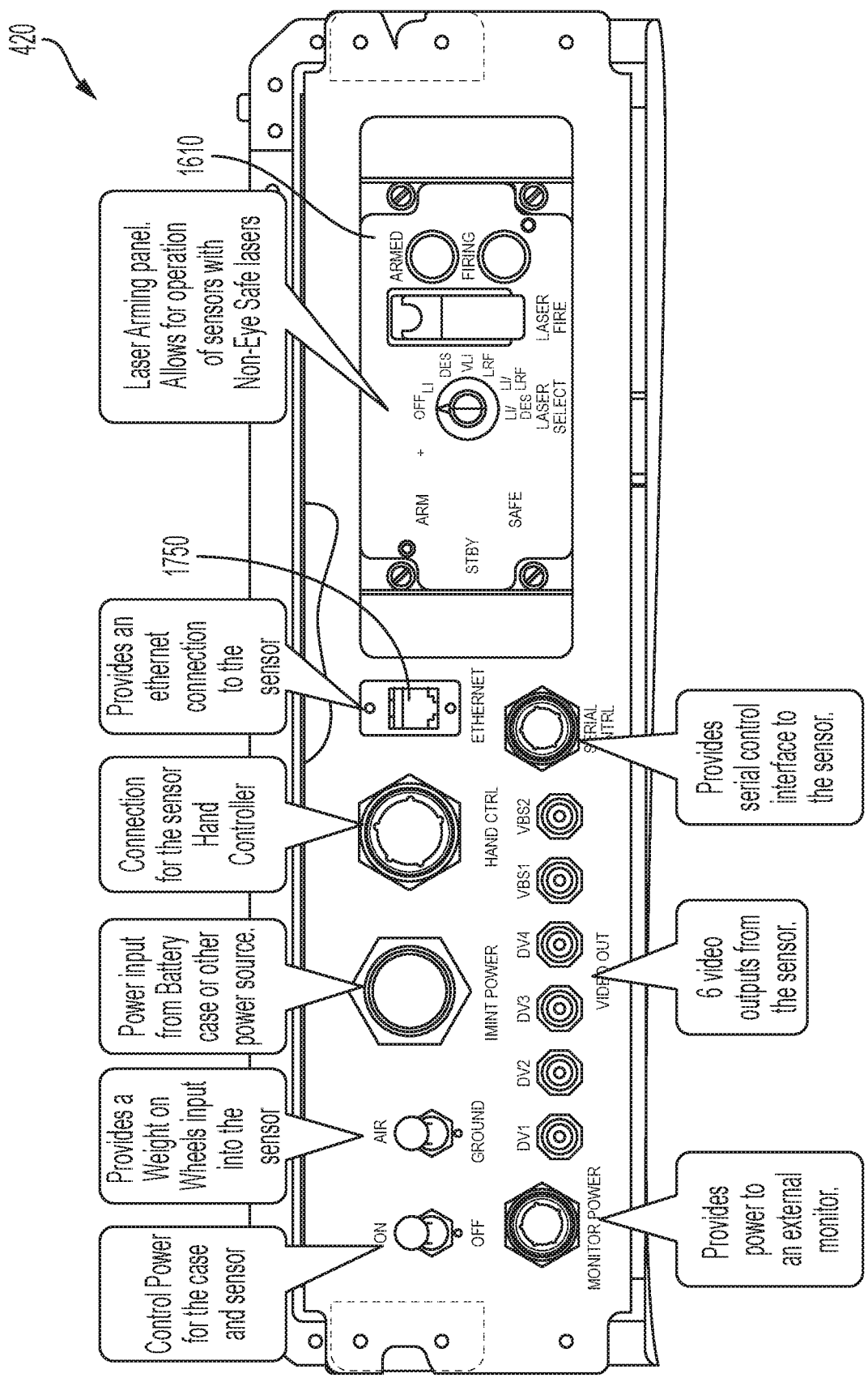
FIG. 16 illustrates a front view of an electrical panel according to one exemplary embodiment of the disclosed systems and methods.

In one embodiment, mounting plate 126 may also include mounting provisions for mechanically coupling electrical conductors to mounting plate 126, e.g., for routing electrical power, control signals, sensor data, etc. to and from EO/IR turret 130. In this embodiment, an external-facing electrical panel 420 may also be mechanically coupled (e.g., via threaded mechanical fasteners, welds, rivets, etc.) as shown to the back side of chassis 108 to allow for electrical connection to electrical conductors routed through or on mounting plate 126, e.g., for provision of power for turret system 110, as well as for other purposes such as input of turret system control commands and/or signals, output of sensor data, wired communication of network data, etc. It will be understood however, that one or more electrical panels may be mechanically coupled to chassis 108 at any other location and/or on any other side of EO/IR turret system 110. Examples of specific electrical panel 420 connections, functions and features that are possible are illustrated in the embodiment of FIG. 16. For example, electrical panel 420 may be provided to allow for local human user input to control EO/IR turret 130 of system 110, as well as for direct output from EO/IR turret system 110 of video data from camera/s or other type/s of sensor/s contained within turret ball 131, for connection of communication media (e.g., Ethernet connection) to transfer network data to and from EO/IR turret system 110, for connection of an external sensor hand controller 1116 to provide control signals for controlling operation of EO/IR turret system 110 (e.g., including gimbal rotation, sensor and/or emitter operation, etc.), for output of power and/or graphics or video data from EO/IR turret system 110 to an external display device 1118, etc.

As shown, one or more optional antennas 122/123 may be mechanically coupled to mounting plate 126 in position to extend outward from the front side of chassis 108 as shown, e.g., to provide wireless data and/or analog signal communication to and from EO/IR turret system 110 including, but not limited to, video downlink to another platform or remote location, network communications between the EO/IR turret system 110 and another platform or remote location, remote control signals to the EO/IR turret system 110 from another platform or remote location, GPS satellite signals, etc. An antenna 122 may be of any suitable type, e.g., such as a Model No. 3G1215A-XNS-1 antenna available from Antcom Corporation of Torrance, Calif., etc. An antenna feed conductor/s for providing signals to (and receiving signals from) antenna/s 122/123 may be provided to extend on or within mounting plate 126 from at least one of EO/IR turret 130 and/or electrical panel 420.

Other optional features of EO/IR turret system 110 include rigid reinforcement brackets 117 (e.g., metal, fiberglass, etc.) that may be present to mechanically couple and extend between left side 112c and bottom side 112b, and between right side 112d and bottom side 112b of chassis 108 adjacent the front end of system 110 to reinforce and strengthen chassis 108 for stabilizing and supporting the weight of the EO/IR turret 130 as illustrated in FIGS. 3 and 4. Optional side rail members 402 (e.g., aluminum or steel rails) may be mechanically coupled as shown to each of left side 112c and right side 112d to extend adjacent the top side 112a of chassis 108 for purpose of providing a structure to mount plate 126 to chassis 108, e.g., with threaded fasteners. A back access plate 410 may also be provided and fastened as shown adjacent the back end of chassis 108, and may include a circular opening 412 provided for purpose of providing weight savings and maintenance access. Other optional features include electrically-conductive ground straps 404 which may be provided adjacent back end of chassis 108 as shown for purpose of electrically grounding the chassis case or other chassis structure to the vehicle structure such as metal seat tracks.

Figure 6:
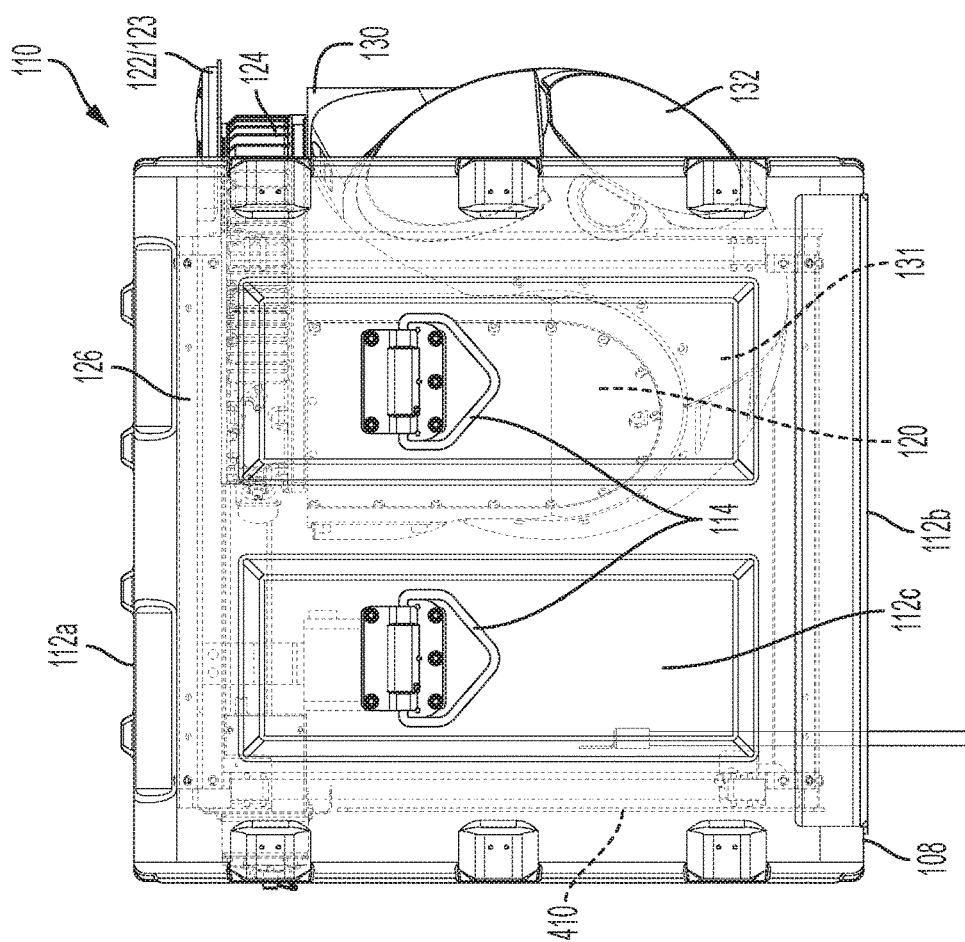
FIG. 6 illustrates a side view of an EO/IR turret system according to one exemplary embodiment of the disclosed systems and methods.
Figure 5:
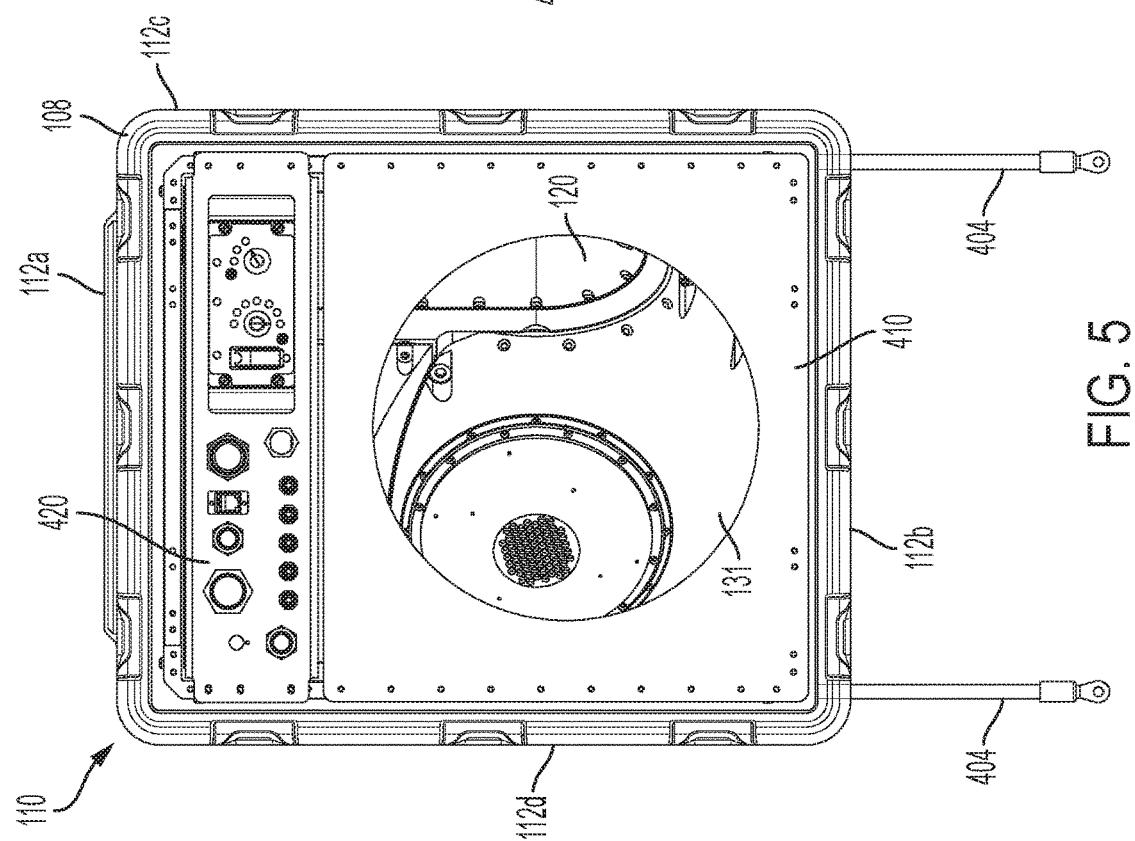
FIG. 5 illustrates a rear view of an EO/IR turret system according to one exemplary embodiment of the disclosed systems and methods.
Figure 7:
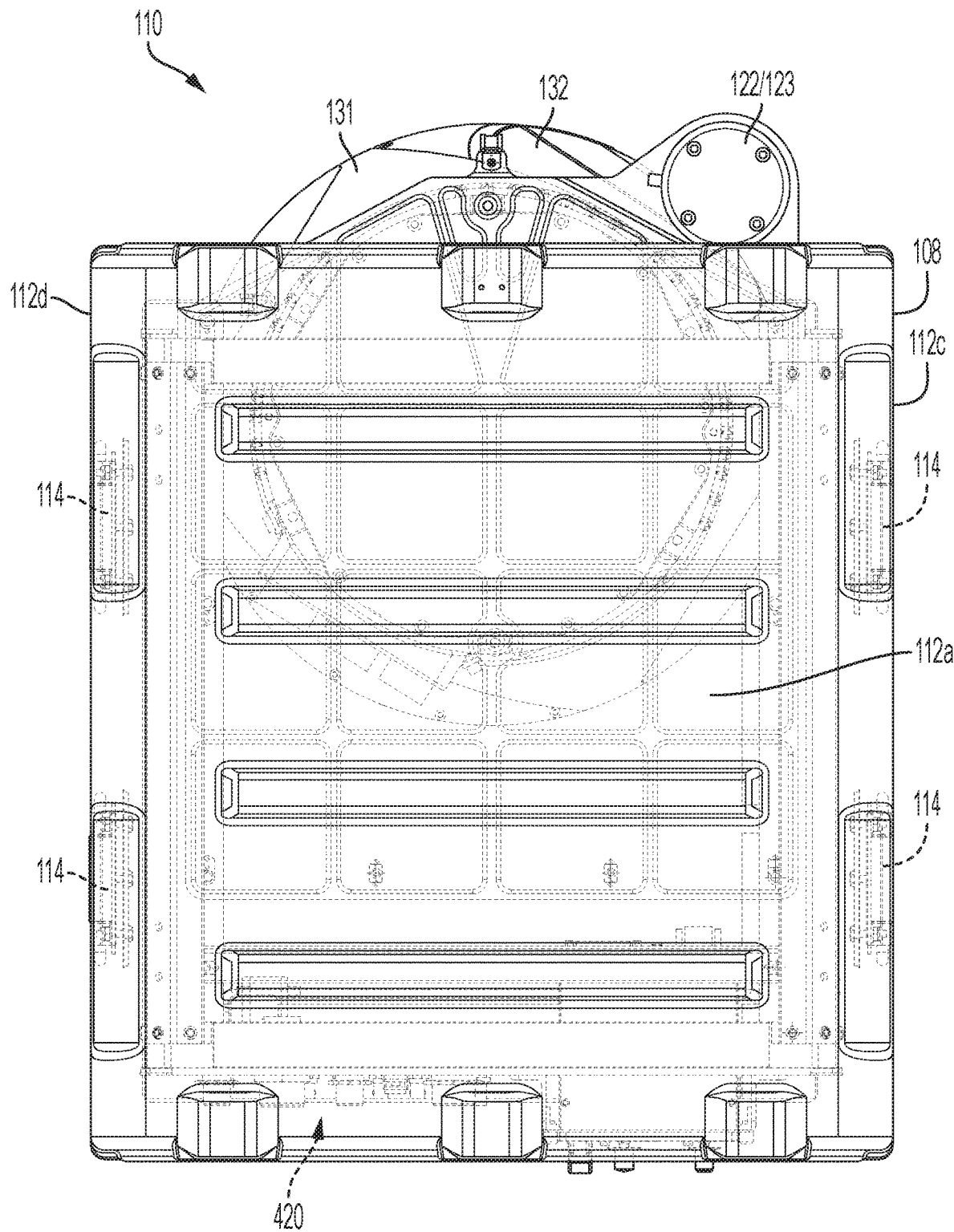
FIG. 7 illustrates an overhead view of an EO/IR turret system according to one exemplary embodiment of the disclosed systems and methods.
Figure 9:
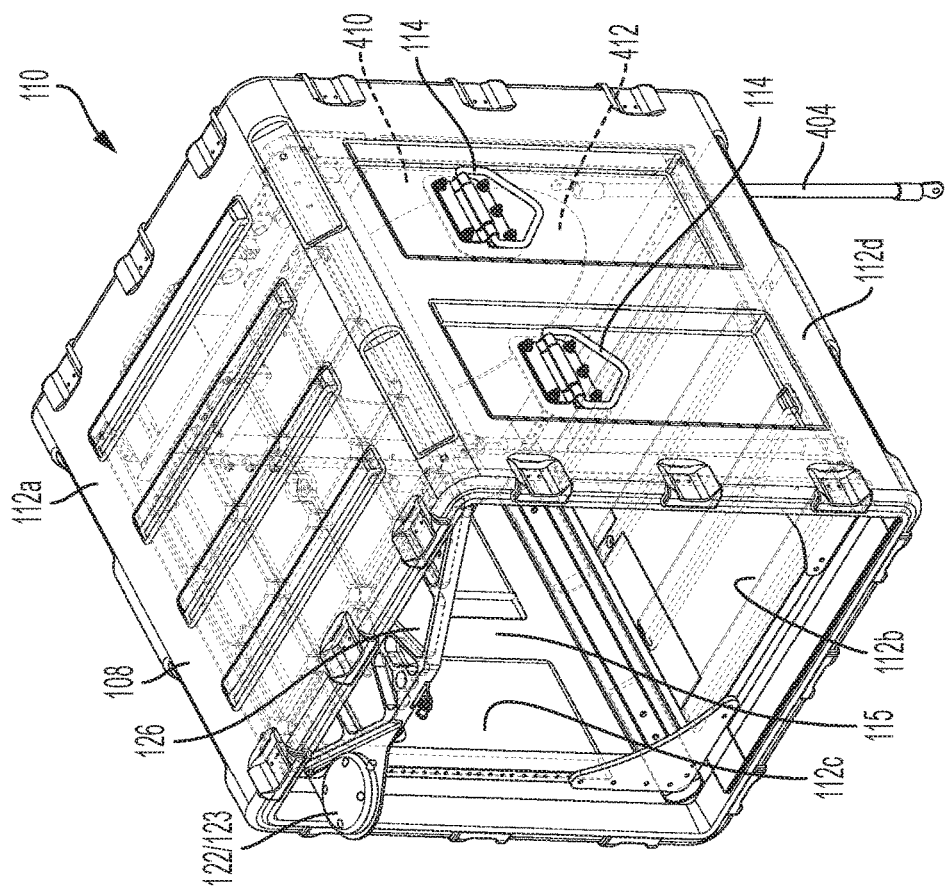
FIG. 9 illustrates a front overhead perspective view of EO/IR turret system components according to one exemplary embodiment of the disclosed systems and methods.
Figure 8:
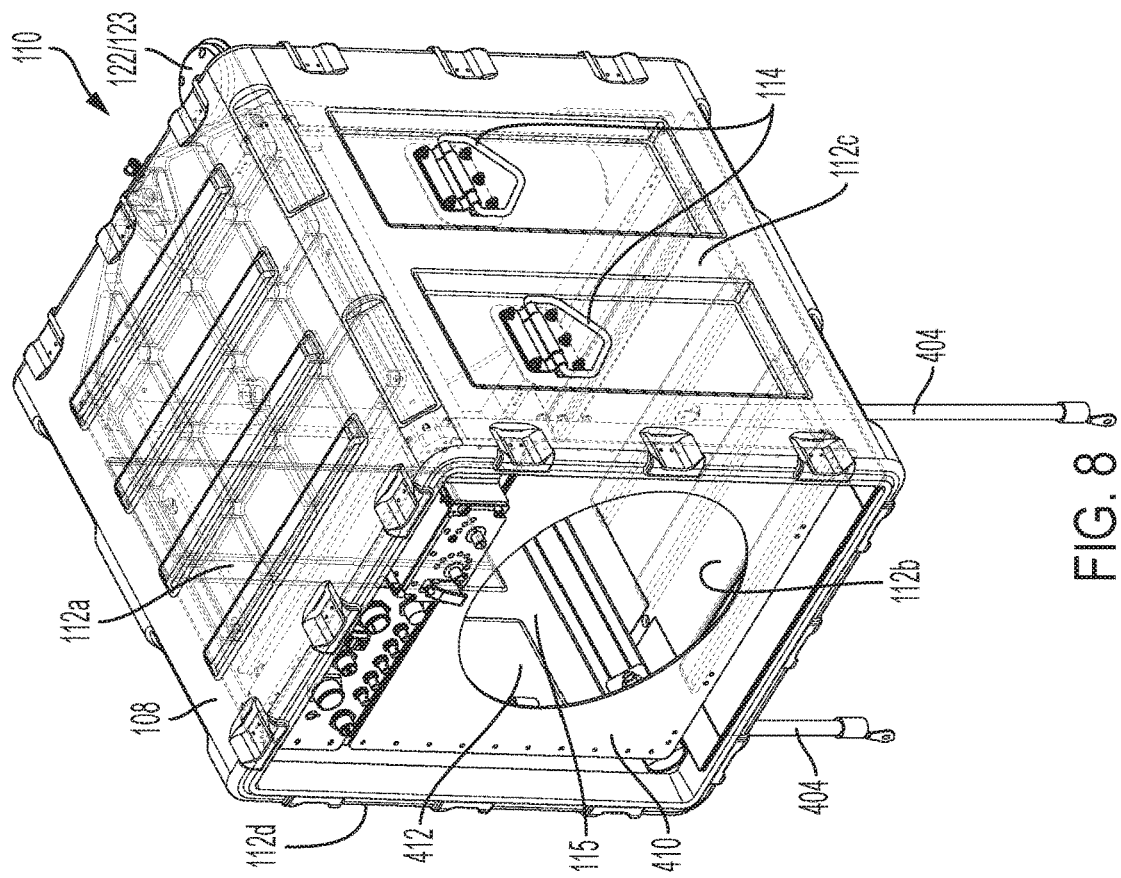
FIG. 8 illustrates a rear overhead perspective view of EO/IR turret system components according to one exemplary embodiment of the disclosed systems and methods.
Figure 10:
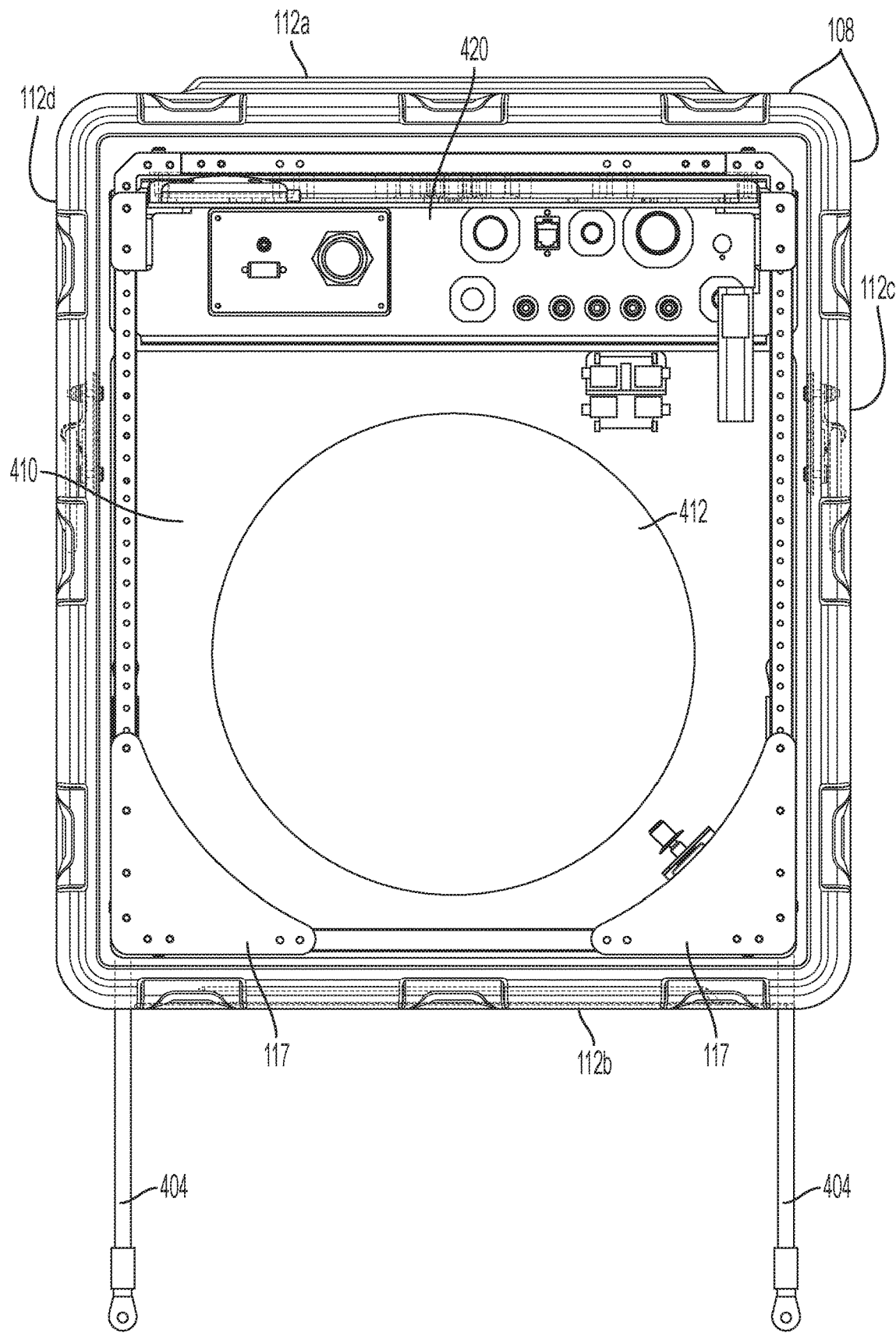
FIG. 10 illustrates a front view of EO/IR turret system components according to one exemplary embodiment of the disclosed systems and methods.

Additional views of portable EO/IR turret system 110 are found in FIGS. 5, 6 and 7. Additional perspective views of EO/IR turret system components without turret 130 are found in FIGS. 8, 9 and 10.

Figure 11:
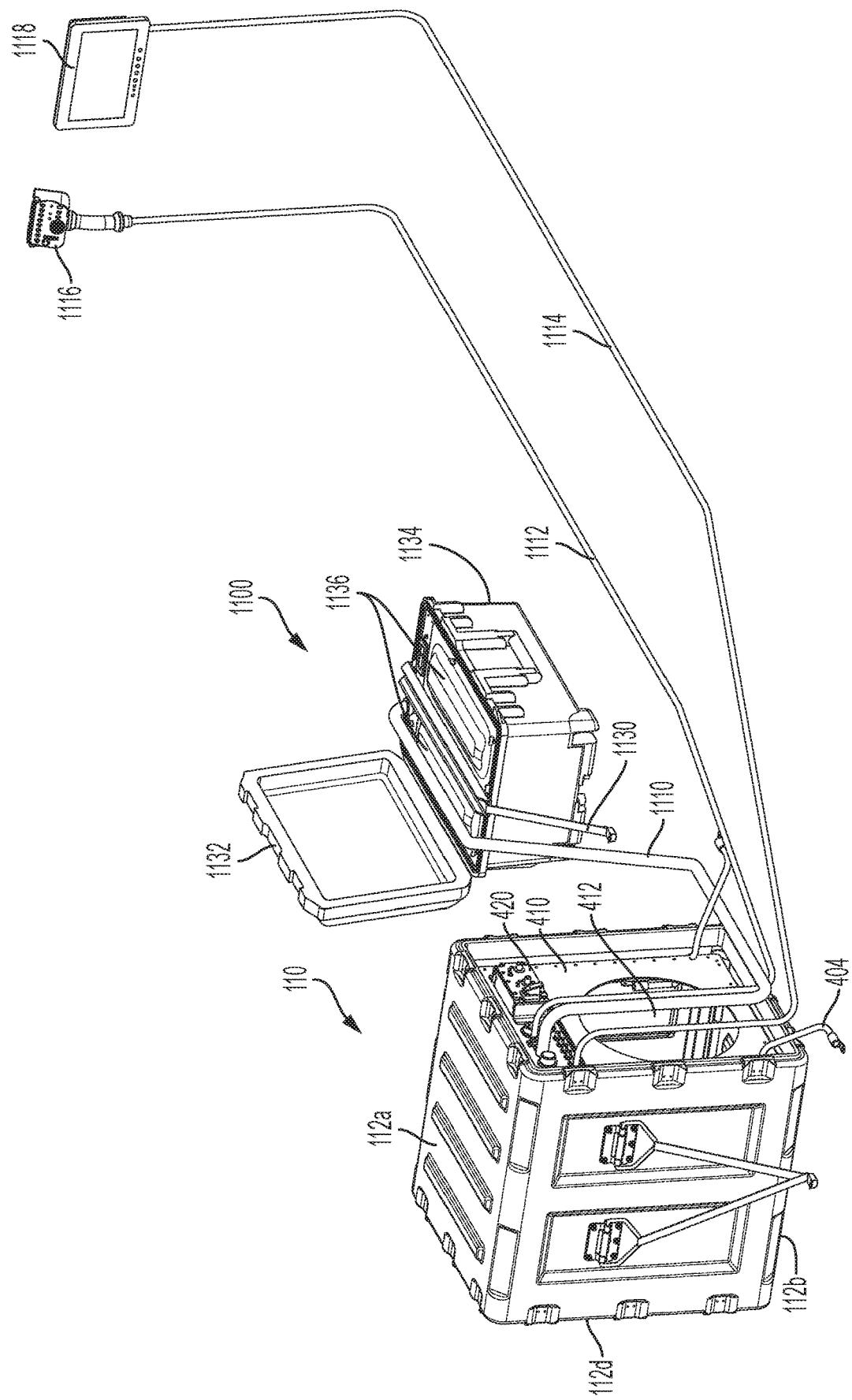
FIG. 11 illustrates a perspective view of a portable EO/IR turret system coupled to and deployed together with a portable power source, hand controller and display device according to one exemplary embodiment of the disclosed systems and methods.
Figure 12:
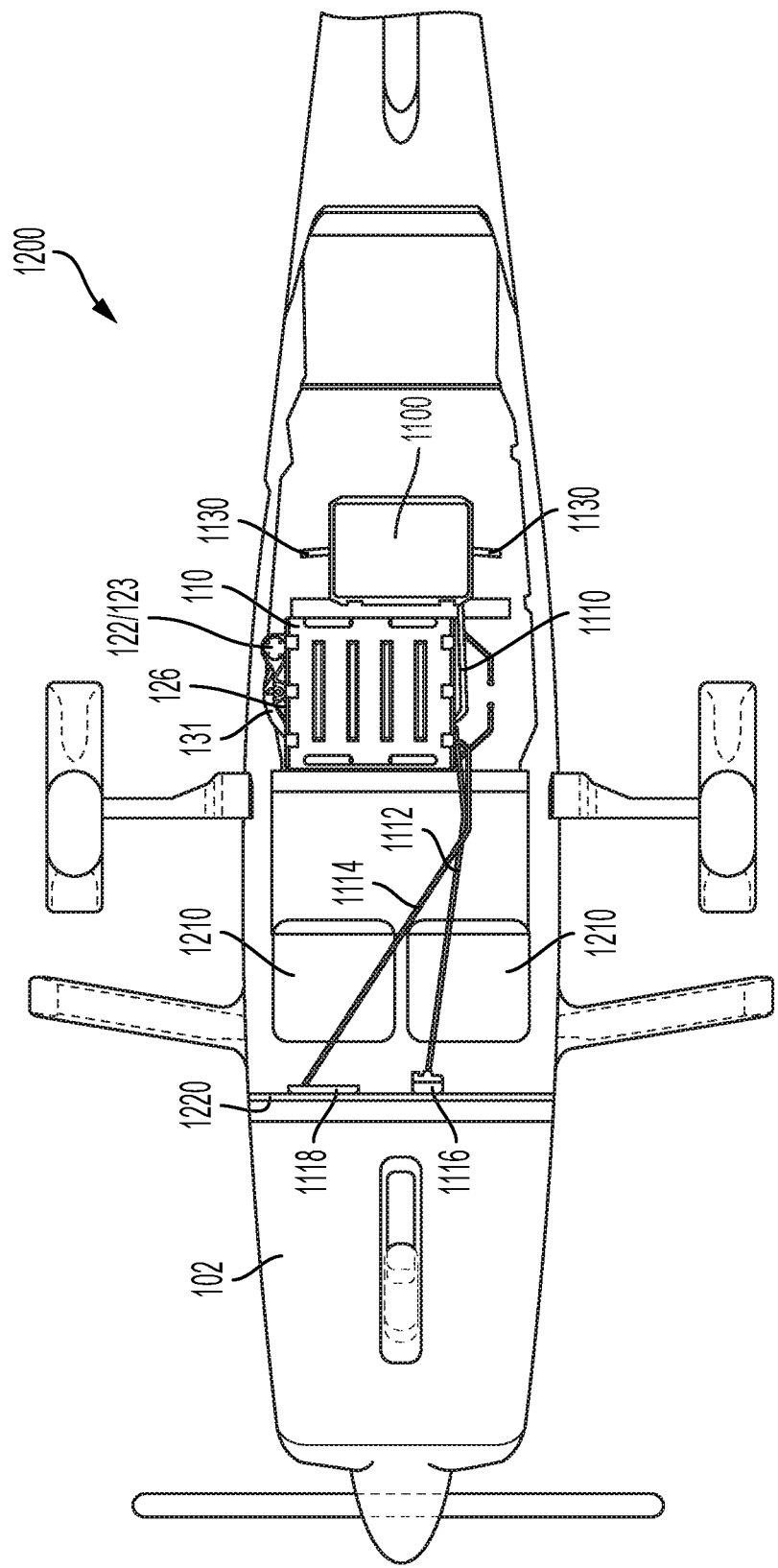
FIG. 12 illustrates an underside view of a portable EO/IR turret system deployed together with a portable power source, hand controller and display device deployed on an aircraft host platform according to one exemplary embodiment of the disclosed systems and methods.

FIG. 11 illustrates one exemplary embodiment of a portable EO/IR turret system 110 as it may deployed together with a portable power source 1100, hand controller 1116 and display device 1118, e.g., on a stationary or mobile host platform such as aircraft 100. In this embodiment, power source 1100 may be one or more batteries 1136 (e.g., 12 or 24 volt lead acid/gel cell battery, lithium ion battery, nickel cadmium battery, etc.) contained within a portable container case 1134 that is hingeably coupled to a lid 1132 with hinges, although one or more batteries 1136 may be provided and deployed on a host platform without a portable case (e.g., such as mounted to a portable pallet, or placed stand alone on a platform without a container case or other mounting provision). Such a portable power source 1100 may be provided such that no power provided from the host platform is required for operation. In one embodiment, a charged portable power source 1100 may provide sufficient power to continuously operate portable EO/IR turret system 110 for 6 to 8 hours, although a portable power source 1100 may also be configured to provide power for greater or lesser continuous operation times.

Figure 13:
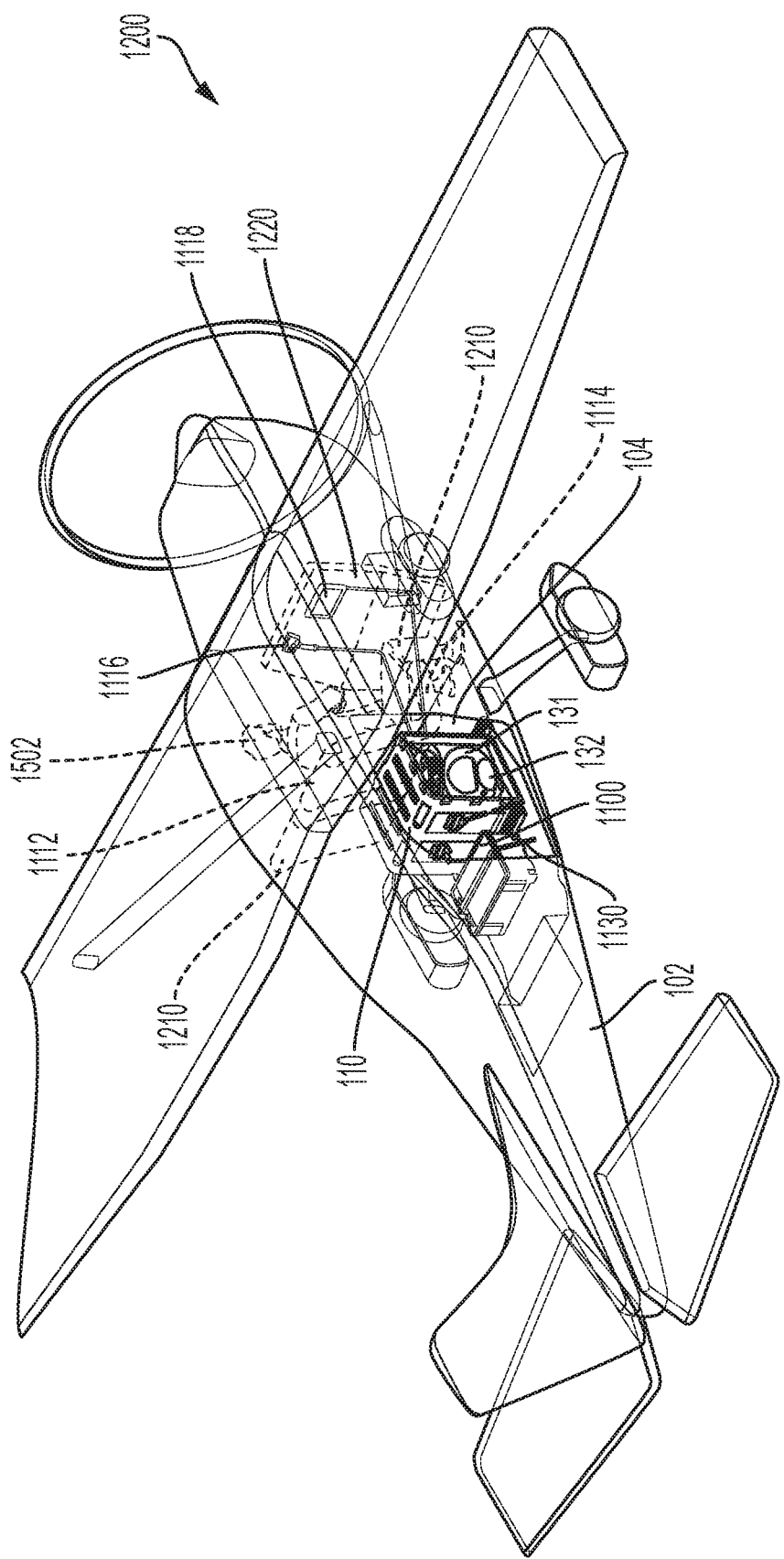
FIG. 13 illustrates an overhead side perspective view of a portable EO/IR turret system deployed together with a portable power source, hand controller and display device deployed on an aircraft host platform according to one exemplary embodiment of the disclosed systems and methods.
Figure 14:
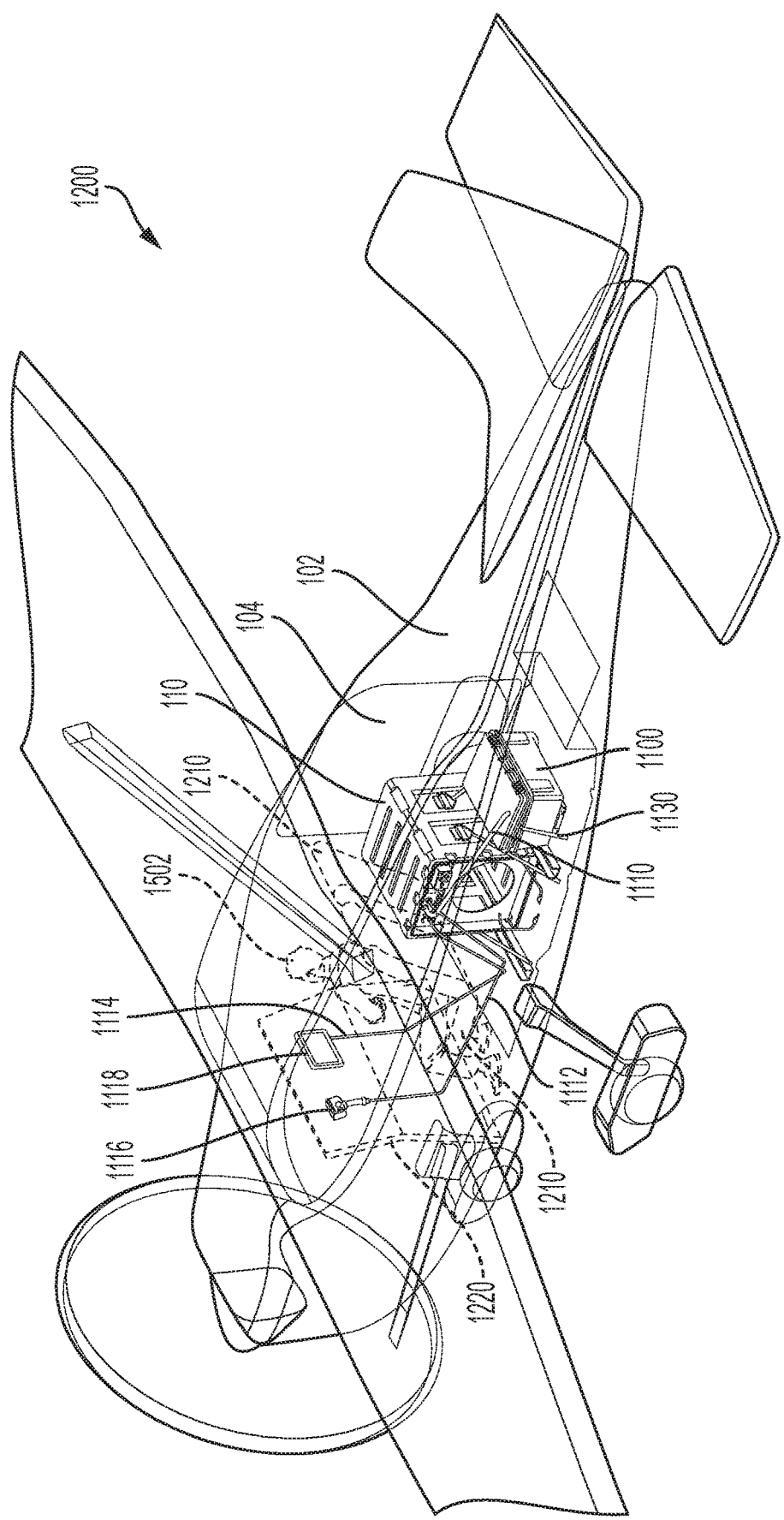
FIG. 14 illustrates an overhead rear side perspective view of a portable EO/IR turret system deployed together with a portable power source, hand controller and display device deployed on an aircraft host platform according to one exemplary embodiment of the disclosed systems and methods.
Figure 15:
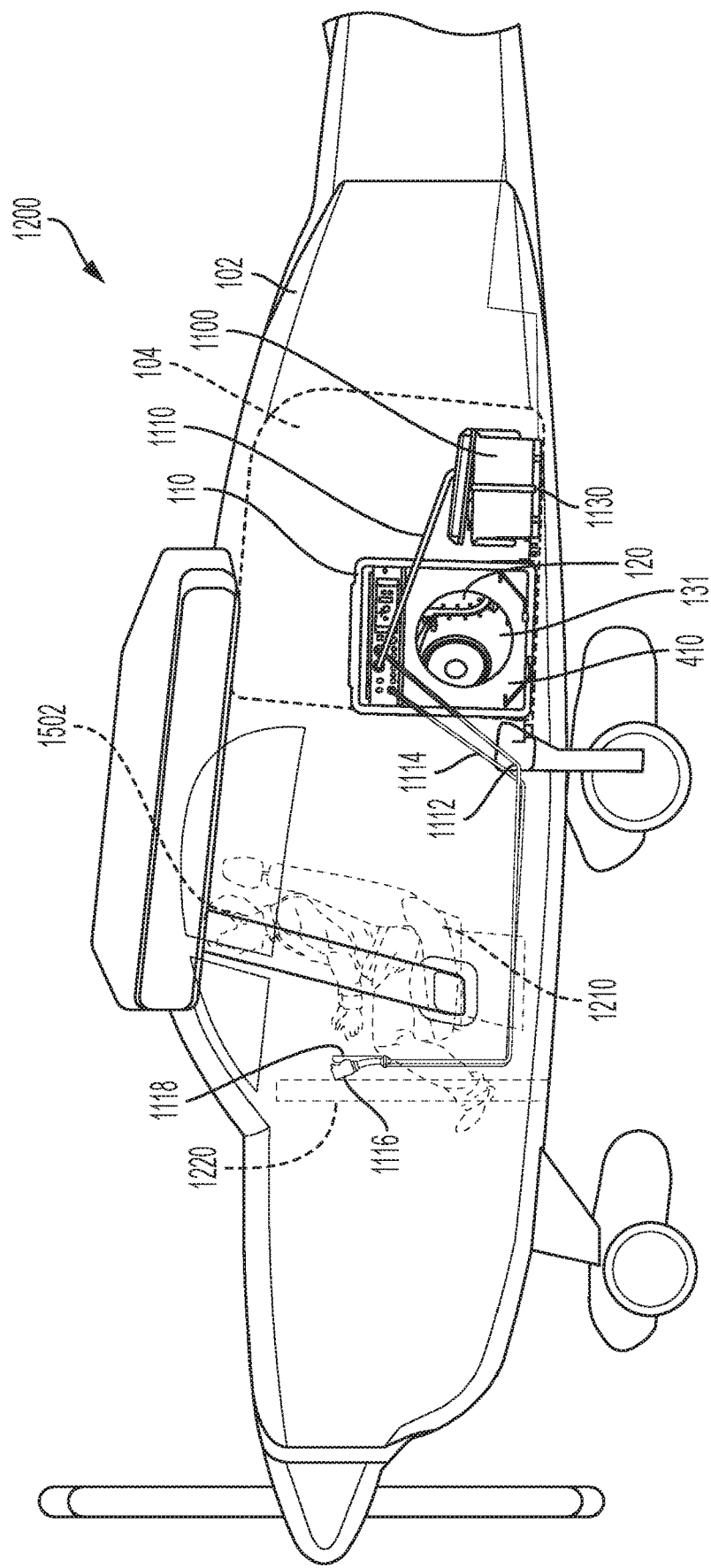
FIG. 15 illustrates a side view of a portable EO/IR turret system deployed together with a portable power source, hand controller and display device deployed on an aircraft host platform according to one exemplary embodiment of the disclosed systems and methods.

As shown in FIGS. 13-15, portable power source 1100 is dimensioned and shaped to fit through door opening 104 to be loaded onto aircraft 100 in similar manner as portable chassis 108. As shown, tie-down straps 1130 may be provided to temporarily secure portable power source 1100 to a platform floor surface or other surface of a host platform, e.g., in similar manner as described in relation to turret system tie-down straps 150 of FIGS. 1 and 2.

Figure 17:
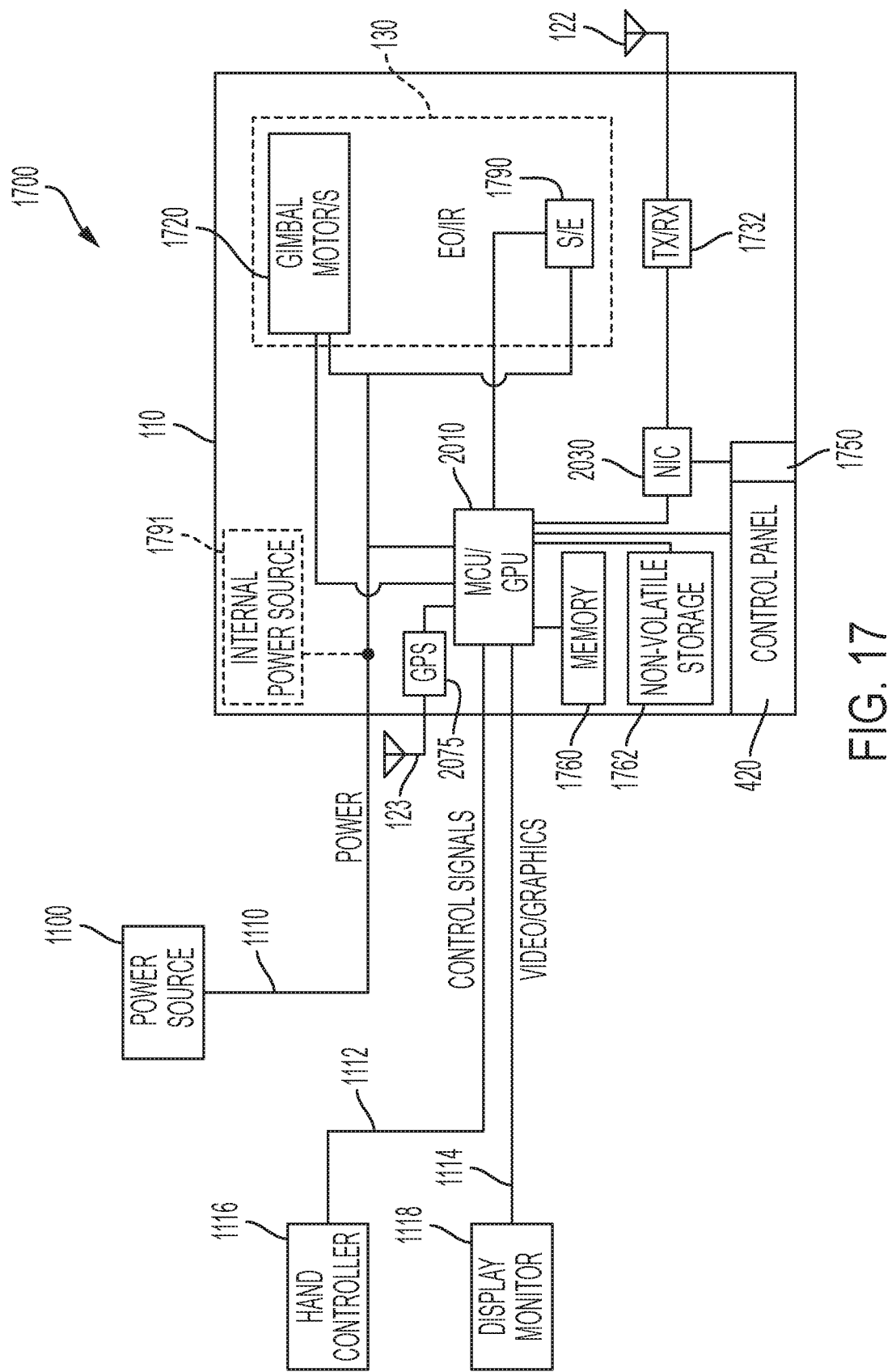
FIG. 17 illustrates a block diagram of circuitry of a portable EO/IR turret system and associated components according to one exemplary embodiment of the disclosed systems and methods.

As shown in FIG. 11, batteries 1136 may be coupled to a power input connector on electrical panel 420 by power conductor/s 1110 (e.g., electrically conductive power cable/s) for providing power to operate gimbal motors, sensors, emitters, microcontrollers, and other circuitry of EO/IR turret system 110 such as illustrated and described in relation to FIG. 17. When used to execute a mission with a host platform, batteries of a portable power source may be charged prior to deployment on or within the host platform, and/or may be charged and/or recharged while deployed on the host platform, e.g., in one case by an electrical system of a host platform such as aircraft 100. It will also be understood that other power source configurations are possible. For example, an EO/IR turret system 110 may be coupled to and powered directly (e.g., without portable power source 1100) by an electrical system of a host platform such as aircraft 100, or an EO/IR turret system 110 may be powered by one or more internal batteries disposed within or otherwise integrated with the same portable chassis 108.

Still referring to FIG. 11, hand controller 1116 may be coupled to EO/IR turret system 110 by an electrically conductive cable/s (e.g., a data bus and/or multi-conductor cable) 1112 that communicates human user input control command data as signal/s from another location on or within the same host platform, such as illustrated in FIGS. 12-15 for aircraft 100. Hand controller 1116 may include one or more user input/output (I/O) devices (e.g., push buttons, switches, keyboard keys, mouse, touchpad, joystick, etc.). Examples of human user control commands that may be entered to control one or more functions of EO/IR turret system 110 include, but are not limited to, commands to gimbal actuator/s to slew the turret about both axes, zoom in/out, auto tracking engagement/disengagement, sensor selection cycling, energy emitter (e.g., laser) range finder activation, emitter (e.g., laser) illuminator activation/deactivation, energy emitter (laser) target designation activation/deactivation, menu access and control, etc.

Also shown in FIG. 11 is display device 1118 (e.g., LCD or LED flat panel display monitor) that may be coupled to EO/IR turret system 110 by an electrically conductive cable/s 1114 (e.g., a data bus and/or multi-conductor cable) that communicates video, graphics and/or raw or processed sensor data as signals from EO/IR turret system 110 to display device 1118 at another location on or within the same host platform for viewing by a human user. It will be understood that in some embodiments display device 1118 may be a touchscreen device that also include I/O capability for receiving input from a human user to control one or more functions of EO/IR turret system 110. In some embodiments, components and functions of hand controller 1116 and display device 1118 may integrated or otherwise combined into a single component or device that is similarly coupled to EO/IR turret system 110. It will also be understood that data and/or signal communications of either or both of electrically conductive cables 1112 and/or 1114 may be alternatively be performed by wireless communication (e.g., IEEE 802.11x, etc.) that is implemented on or within a host platform such as aircraft 100. As described further herein, incoming command data and/or outgoing sensor data may be processed by a programmable integrated circuit internal or integrated with chassis 130.

FIGS. 12-15 illustrate various views of a portable EO/IR turret system 110 as it may deployed together with a portable power source 1100, hand controller 1116 and display device 1118 on a mobile host platform such as aircraft 100. In the embodiment of FIGS. 12-15, EO/IR turret system 110 and portable power source 1100 may be positioned and secured adjacent each other as previously described for aircraft 100 of FIGS. 1-2. As shown, hand controller 1116 and display device 1118 may be positioned separately from EO/IR turret system 110 at a location within aircraft 100 that is accessible and viewable by a human user 1502 sitting on aircraft seat/s 1210 in the aircraft cockpit as shown in FIG. 15 (e.g., clamped or otherwise temporarily secured to cockpit instrument panel 1220). Cables 1112 and 1114 may be temporarily routed on the aircraft floor between EO/IR turret system 110 and hand controller 1116 and display device 1118 as shown.

FIG. 16 illustrates a front view of electrical interface panel 420 with its respective functions labelled according to one exemplary embodiment of the disclosed systems and methods. In particular, illustrated are various I/O devices and connectors as they may be provided for receiving human user control input and for exchanging data, power and control signals with sensor/s, emitter/s and other circuitry of EO/IR turret system 110. As further shown in the embodiment of FIG. 16, an optional emitter sub-panel 1610 is also provided that includes user input devices (e.g., switches) for receiving human user input for controlling operation of an energy emitter disposed within turret ball 131 of turret 130, which in this embodiment is a laser although other types of energy emitters are possible. Multiple video data outputs and a monitor power output may also be present as shown to provide video data and monitor power output to one or more external display devices such as display monitors. In the embodiment of FIG. 16, the IMINT Power connector is configured to receive power input from power source 1100 via power conductor/s 1110.

FIG. 17 illustrates a block diagram of circuitry 1700 of portable EO/IR turret system and associated components according to one exemplary embodiment of the disclosed systems and methods. In one embodiment, all of the illustrated components shown as part of EO/IR turret system 110 of FIG. 17 may be mechanically coupled to or otherwise integrated with (within or on) chassis 108 of portable EO/IR turret system 130. One or more gimbal actuator/s (e.g., electric motor/s or servo/s or other actuator type such as hydraulic actuator/s, pneumatic actuators, etc.) may be present as shown to actuate gimbal mechanisms 120 and 124.

In the embodiment of FIG. 17, gimbal actuator/s of EO/IR turret system 130 are present in the form of electric gimbal motors 1720, and sensor/s and/or emitter/s (S/E) 1790 may be disposed within a turret ball 131 of EO/IR turret 130 as previously described. As further shown in the embodiment of FIG. 17, S/E 1790 and gimbal motors 1720 may be coupled (e.g., by at least one data bus) to one or more programmable integrated circuits 2010 which may be, for example, a microcontroller (MCU) with integrated or separate graphics processing unit (GPU). However, movement and control of gimbal actuators 1720 may be provided in any other manner suitable for the given type of gimbal actuator, such as by controlling flow of pressurized fluid (e.g., pressurized hydraulic fluid, pressurized gas, etc.). In the latter examples, supply and control of pressurized fluid may be provided internal or external to the EO/IR turret system 130, for example, supplied by a pressurized fluid source (e.g., pump, compressor, pressurized storage tank, etc.) internal to the EO/IR turret system 130, or supplied from an external pressurized fluid source.

Programmable integrated circuit/s 2010 may in turn be electrically coupled in power, signal or data communication with various other components of portable EO/IR turret system 130, e.g., by respective data buses, power conductors, or other type electrical conductors suitable for implementing exchange of power, data and/or control signals as appropriate for operation of the individual components of portable EO/IR turret system 130. Examples of such components include, but are not limited to, volatile memory 1760 and non-volatile storage 1762 that may be present to support execution of software, firmware and other operations of programmable integrated circuit/s 2010, and to store programming and collected data (e.g., video and/or other sensor data) for turret system 110. Programmable integrated circuit/s 2010 may also be coupled to control operation of gimbal motor/s 1720, and to receive and provide data to and from control panel 420 as shown. Separate hand controller 1116 and display device 1118 may also be coupled via respective cables 1112 and 1114 to programmable integrated circuit/s 2010 for performing functions thereof that are described elsewhere herein.

Other components that may be coupled to programmable integrated circuit/s 2010 include a network interface controller (NIC) 2030 coupled to exchange wireless network data via a RF transmitter, RF receiver and/or RF transceiver (TX/RX) 1732 and RF antenna/s 122, and/or to exchange wired network data via Ethernet port 1750 (e.g., for control from an external computer such as a notebook or other type of computer, downloading collected video or other types of sensor data to a notebook or other type computer, etc.). Global positioning system (GPS) circuitry 2075 (and/or other navigational circuitry or systems) may also be optionally present and coupled to GPS antenna 123 as shown.

In one embodiment, it is optionally possible that programmable integrated circuit 2010 may be programmed to automatically operate sensor/s and/or emitter/s 1790 to automatically collect sensor data in an unattended manner, e.g., based on real time global positioning system (GPS) coordinates calculated and provided by GPS subsystem 2075. In such an embodiment, programmable integrated circuit 2010 may be programmed with a target GPS coordinate area before initiating a mission, and portable EO/IR turret system 110 may then be operated by programmable integrated circuit 2010 in an unattended manner to collect and downlink and/or store sensor data when a manned or unmanned mobile host platform is in the target GPS coordinated area.

Also shown in FIG. 17 is power source 1100 coupled via power conductor/s 1110 to provide power to circuitry and motors of turret 130 (including gimbal motors), sensor/s and/or emitter/s 1790, programmable integrated circuit's 2010, and other power-consuming circuitry of portable EO/IR turret system 130. As described herein, power source 1100 may include one or more batteries 1136, or may be any other DC or AC power source that is suitable for powering the power-consuming circuitry components of portable EO/IR turret system 130. Optional internal power source 1791 (e.g., batteries such as of the type previously described herein) is also shown. When internal power source 1791 is present, external portable power source 1100 may not be present.

FIGS. 18-20 each illustrate a portable EO/IR turret system 110 deployed within an interior area (e.g., within a passenger cabin, cargo area and/or luggage area) defined within a fuselage 102 of a different type of airborne host platform that in each case is an aircraft 100 that is airborne and flying a EO/IR mission in which EO/IR sensors and/or energy emitters are operated on the airborne aircraft 100. Although illustrated as manned aircraft 100 in FIGS. 18-20, it will be understood that a mobile host platform may alternatively be unmanned, e.g., such as an unmanned aerial vehicle (UAV). Unmanned seaborne and land vehicles may also be employed as mobile host platforms, which are remotely controlled to collect and downlink and/or store sensor data. In one embodiment, programmable integrated circuit 2010 may be programmed with a target GPS coordinate area before initiating a mission, and portable EO/IR turret system 110 may then be operated by programmable integrated circuit 2010 in an unattended manner to collect sensor data when the unmanned mobile host platform is in the target GPS coordinated area in a manner as previously described herein.

In each of FIGS. 18-20, the portable EO/IR turret system 110 is positioned adjacent an open door opening 104 of the respective aircraft 100 to afford EO/IR turret 130 an open and off-platform field of view through an open door opening 104 to the environment outside and separate from the aircraft fuselage 102, for example, including above and/or beneath the airborne aircraft 100 (e.g., such as a field of view of the ground, surrounding airspace, or outer space). Examples of features that may be within an off-platform field of view of an airborne portable EO/IR turret system 110 may include features on the ground, in the air, overhead in space, etc. In any case, operational control of portable EO/IR turret system 110 (e.g., including turret movement and sensor and/or emitter operation) may originate locally on the host platform (e.g., by human user input to electrical panel 420 and/or hand controller 1116 and display device 1118) or may originate remotely from a location separate from the host platform, e.g., such as control signals received via RF antenna/s 122 from the ground, from a separate platform such as another aircraft, from a ground-based or sea-based vehicle, etc. Specific examples include, but are not limited to, remote control RF signals 1831 received via antenna/s 122 from another aircraft 1830, remote control RF signals 1931 received via antenna/s 122 from a ground based human 1930, remote control RF signals 2031 received via antenna/s 122 from an ATV 2030 parked on a hill, etc.

Figure 21:
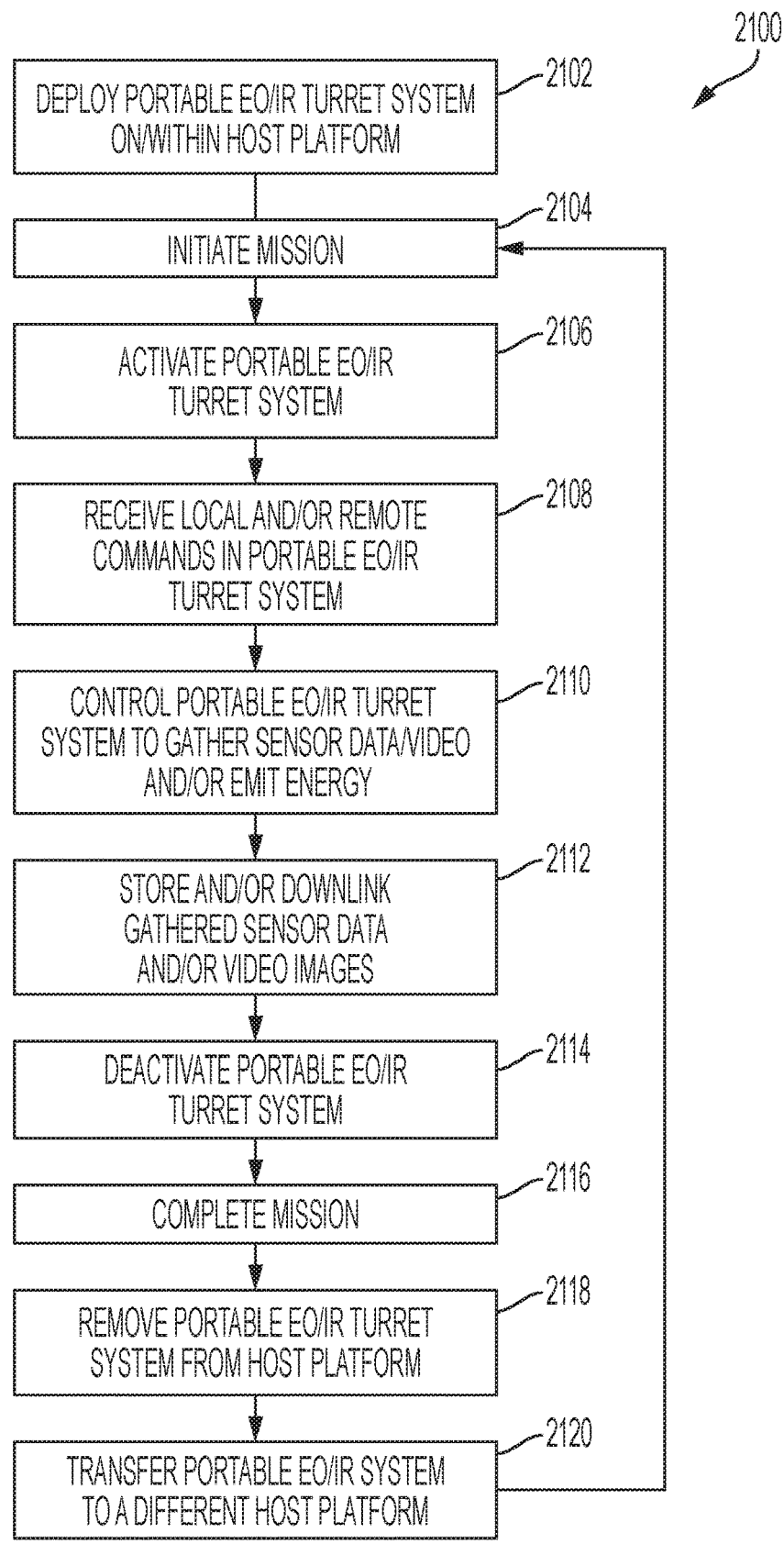
FIG. 21 illustrates methodology according to one exemplary embodiment of the disclosed systems and methods.

FIG. 21 illustrates one exemplary embodiment of methodology 2100 that may be performed utilizing a portable EO/IR turret system 110 such as described elsewhere herein.

As shown, methodology begins in step 2102 where portable EO/IR turret system 110 is deployed on a host platform such as an aircraft 100 of FIG. 18-20, e.g., using techniques and components described in relation to FIGS. 1 and 2. In the case of an aircraft 100, the portable EO/IR turret system 110 may be loaded into the fuselage 102 of an aircraft 100 through open door opening 104. One or more other components may also be deployed on the host platform and operably coupled to the portable EO/IR turret system 110 at this time including, for example, portable power source 1100, hand controller 1116 and display device 1118 such as illustrated and described in relation to FIGS. 11-15. However, no other such components may be required, such as in the case of a portable EO/IR turret system 110 that is completely self-contained and includes its own internal power source within chassis 108 or is coupled to a host platform power source only by a conductive power cable that is plugged into a power outlet.

Next in step 2104, an EO/IR mission employing the portable EO/IR turret system 110 may be initiated. Where the host platform is mobile (e.g., in the case of a ground vehicle, sea-going vessel, or aircraft) step 2104 may include departing from a ground base or port, or taking off from an airport runway when the host platform system is an aircraft 100. When the host platform is an aircraft 100, departure and take off (and landing) operations may be performed with door 103 closed.

Portable EO/IR turret system 110 may then be activated in step 2106 by turning on the power-consuming electrical circuitry of the EO/IR turret system 110 and activating the sensor/s and/or emitter/s 1790 for operation. Where employed, wired or wireless network communications with portable EO/IR turret system 110 may also be initiated at this time, e.g., via antenna/s 122 and/or Ethernet port 1750. However, it will be understood that some or all of the electrical components of a portable EO/IR turret system 110 may be turned on earlier, such as during step 2104. When the host platform is mobile, activation of step 2106 may be performed after the host platform has travelled to a geographic position where EO/IR operations are desired. In the case of an aircraft host platform 100, door 103 may be opened at this time to allow the sensor/s and/or emitter/s 1790 access to the environment outside fuselage 102 of aircraft 100.

Next, in step 2108, local and/or remote commands (e.g., for operating turret gimbals, sensor/s and/or emitter/s 1790, etc.) may be received by at least one programmable integrated circuit 2010 of portable EO/IR turret system 110, e.g., via local command input by a human user to electrical panel 420, local input by a human user to hand controller 1116, by remote input via wired or wireless network communications described above, or by direct wireless radio frequency (RF) signal commands received by antenna/s 122.

In step 2110, programmable integrated circuit 2010 may respond to received commands of step 2108 by controlling other components (e.g., turret gimbals, sensor/s and/or emitter/s 1790, etc.) of portable EO/IR turret 110 to gather sensor data, gather video images and/or to emit energy. In step 2112 any gathered sensor data (e.g., video or other sensor data) may be, for example, stored locally on storage 1762 (for later retrieval), transmitted by data downlink via antenna/s 122 to stationary ground base or another mobile vehicle, and/or transmitted by network communications via wired or wireless network previously described.

After the EO/IR mission has been completed, the portable EO/IR turret system 110 may be deactivated in step 2114, e.g., by turning off some or all of its power-consuming electrical components. In the case of an aircraft host platform 100, door 103 may be closed at this time for the duration of the flight and until the EO/IR mission is completed.

The EO/IR mission may be completed in step 2116. For example, in the case of a mobile host platform, the host platform may return to a base, e.g., host platform aircraft 100 may land at an airport and taxi to a parking spot.

After mission completion, the portable EO/IR turret system 110 may then be removed from the host platform in step 2118, e.g., door 103 of aircraft 100 may be opened and the portable EO/IR turret system 110 may be removed through door opening 104 in fuselage 102. Any other associated components (e.g., portable power source 1100, hand controller 1116 and display device 1118) may be electrically uncoupled from portable EO/IR turret system 110 and also removed from the host platform.

In optional step 2120, the same portable EO/IR turret system 110 may be transferred and deployed on a second and different host platform such as another aircraft 100, or possibly on a different type of mobile or stationary host platform. An additional EO/IR mission may then be carried out on the second and different host platform, e.g., by repeating steps 2104-2118 on the second host platform as shown.

It will be understood that methodology 2100 of FIG. 21 is exemplary only, and that any other combination of fewer, additional or alternative steps may be employed that is suitable for temporarily deploying a portable EO/IR turret on a host platform and performing an EO/IR mission on the host platform.

It will also be understood that one or more of the tasks, functions, or methodologies described herein (e.g., including those described herein for components 1732, 1790, 2010, 2030, 2075, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, microcontroller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, microcontroller, microcontroller, microprocessor, FPGA, CPLD and ASIC. The computer program of instructions may include an ordered listing of executable instructions for implementing logical functions in a computer system or component thereof. The executable instructions may include a plurality of code segments operable to instruct components system components to perform the methodologies disclosed herein.

It will also be understood that one or more steps of the present methodologies may be employed in one or more code segments of the computer program. For example, a code segment executed by a processing device may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A system, comprising:
    a portable chassis comprising multiple sides;
    an electro-optical/infrared (EO/IR) turret present at a point between the multiple sides of the portable chassis, the EO/IR turret supported by the portable chassis and comprising:
        at least one EO/IR sensor or at least one energy emitter rotating about at least one gimbal axis relative to the portable chassis with the EO/IR turret present at the point between the multiple sides of the portable chassis, and
        at least one actuator driving rotation of the at least one EO/IR sensor or at least one energy emitter about the at least one gimbal axis with the EO/IR turret present at the point between the multiple sides of the portable chassis;
    at least one wired or wireless signal output from the portable chassis, the signal output communicating data from the at least one EO/IR sensor or at least one energy emitter while the EO/IR turret is present at the point between the multiple sides of the portable chassis; and
    a self-powered portable power source providing power to operate power-consuming circuitry of the portable chassis that includes at least one of the EO/IR sensor, the energy emitter and/or the actuator;
    where the portable chassis and portable power source are movable while at the same time the portable chassis is supporting the EO/IR turret with the EO/IR turret present at the point between the multiple sides of the portable chassis.

2. The system of claim 1, further comprising at least one wireless signal input to the portable chassis, the signal input communicating command data to control operation of at least one of the EO/IR sensor, energy emitter, or actuator.

3. The system of claim 1, where the multiple sides of the portable chassis comprise top and bottom side walls; where an internal area of the portable chassis is defined between the top and bottom side walls with the at least one gimbal axis being present within the internal area of the portable chassis; and where the EO/IR turret is supported and suspended downward from the top side of the portable chassis into the internal area of the portable chassis with the at least one EO/IR sensor or at least one energy emitter rotating in the internal area of the portable chassis about the at least one gimbal axis.

4. The system of claim 1, further comprising a host platform that is separate from the portable chassis, the portable power source providing the power to operate the power-consuming circuitry of the portable chassis with no power provided from the host platform to operate the power-consuming circuitry of the portable chassis; and where the portable chassis and portable power source are moveable onto and off the separate host platform while at the same time the portable chassis is supporting the EO/IR turret with the EO/IR turret present at the point between the multiple sides of the portable chassis.

5. The system of claim 4, where the separate host platform is an aircraft having a fuselage with an opening defined in an outer wall of the fuselage between the inside of the fuselage and an environment outside the fuselage; where the portable chassis is positioned inside the fuselage while supporting the EO/IR turret in a position inside the fuselage and with the EO/IR turret present at the point between the multiple sides of the portable chassis, the entire portable chassis being shaped and dimensioned to be loaded into the fuselage through the opening while at the same time supporting the EO/IR turret with the EO/IR turret present at the point between the multiple sides of the portable chassis; where the power source is positioned inside the fuselage, the power source being shaped and dimensioned to be loaded into the fuselage through the opening; and where the portable chassis is positioned within the fuselage while supporting the EO/IR turret with the EO/IR turret present at the point between the multiple sides of the portable chassis so that the at least one EO/IR sensor or the at least one energy emitter rotates about the at least one gimbal axis while remaining inside the fuselage with a field of view of the environment outside the fuselage that is viewable from inside the fuselage by the at least one EO/IR sensor or the at least one energy emitter while it is positioned inside the fuselage through the opening or a different opening defined in the outer wall of the fuselage to the environment outside the fuselage.

6. The system of claim 1, further comprising at least one programmable integrated circuit integrated with the portable chassis, the at least one programmable integrated circuit being coupled in data communication with the at least one EO/IR sensor, the at least one energy emitter, or the at least one actuator; and where the at least one programmable integrated circuit is programmed to at least one of:
    control operation of the at least one EO/IR sensor, the at least one energy emitter, or the at least one actuator while the EO/IR turret is present at the point between the multiple sides of the portable chassis; or receive data from the at least one EO/IR sensor while the EO/IR turret is present at the point between the multiple sides of the portable chassis.

7. The system of claim 1, further comprising at least one programmable integrated circuit integrated with the portable chassis; at least one integrated radio frequency (RF) antenna coupled in signal communication with at least one of a RF transmitter, RF receiver or RF transceiver integrated with the portable chassis and coupled in data communication with the at least one programmable integrated circuit; where the at least one programmable integrated circuit is coupled in data communication with the at least one EO/IR sensor, the at least one energy emitter, or the at least one actuator; and where the at least a one programmable integrated circuit is programmed to at least one of:
control operation of the at least one EO/IR sensor, the at least one energy emitter, or the at least one actuator in response to RF signals received by the at least one RF antenna while the EO/IR turret is present at the point between the multiple sides of the portable chassis; or
receive data from the at least one EO/IR sensor or energy emitter and transmit the received data in RF signals from the at least one RF antenna while the EO/IR turret is present at the point between the multiple sides of the portable chassis.

8. The system of claim 1, further comprising an electrical panel integrated with the portable chassis, the electrical panel including one or more I/O devices, indicators, displays and/or connectors providing at least one of: power input for electrical circuitry of the system; input of control commands for the EO/IR sensor, energy emitter and/or actuator; output of EO/IR sensor data and/or energy emitter data; or wired communication of network data to at least one programmable integrated circuit integrated with the portable chassis.

9. The system of claim 1, further comprising:
a separate host platform, the portable chassis being a separate and moveable component onto and off the separate host platform while supporting the EO/IR turret in a position with the EO/IR turret present at the point between the multiple sides of the portable chassis;
one or more input/output (I/O) devices and/or display devices that are separate and moveable onto and off the separate host platform and that are coupled in signal communication with the EO/IR sensor, energy emitter and/or actuator to provide at least one of:
human user input of control commands for the EO/IR sensor, energy emitter and/or actuator while the EO/IR turret is present at the point between the multiple sides of the portable chassis, or
output to a human user of EO/IR sensor data and/or energy emitter data while the EO/IR turret is present at the point between the multiple sides of the portable chassis;
where the one or more I/O devices are positioned separately from the portable chassis and the EO/IR turret on the separate host platform.

10. The system of claim 1, where the self-powered portable power source comprises one or more batteries is integrated with the portable chassis and providing the power to operate the power-consuming circuitry of the portable chassis.

11. The system of claim 1, where the self-powered portable power source comprises one or more batteries providing the power to operate the power-consuming circuitry of the portable chassis.

12. The system of claim 1, further comprising a host platform that is separate from the portable chassis, the host platform comprising:
a fuselage with an opening defined in an outer wall of the fuselage between the inside of the fuselage and an environment outside the fuselage, the portable chassis being positioned inside the fuselage while supporting the EO/IR turret in a position inside the fuselage and with the EO/IR turret present at the point between the multiple sides of the portable chassis, the entire portable chassis being shaped and dimensioned to be loaded into the fuselage through the opening while at the same time supporting the EO/IR turret with the EO/IR turret present at the point between the multiple sides of the portable chassis; and
a closed transparent window disposed within the opening or a different opening defined in the outer wall of the fuselage between the environment outside the fuselage and the at least one EO/IR sensor or the at least one energy emitter positioned inside the fuselage;
where the portable chassis is positioned within the fuselage while supporting the EO/IR turret with the EO/IR turret present at the point between the multiple sides of the portable chassis so that the at least one EO/IR sensor or the at least one energy emitter rotates about the at least one gimbal axis while remaining inside the fuselage with a field of view of the environment outside the fuselage that is viewable by the at least one EO/IR sensor or the at least one energy emitter while it is positioned inside the fuselage from the position of the at least one EO/IR sensor or the at least one energy emitter inside the fuselage through the closed transparent window to the environment outside the fuselage.

13. A method, comprising:
positioning a portable chassis together with an electro-optical/infrared (EO/IR) turret on a host platform that is separate from the portable chassis, the portable chassis comprising multiple sides and supporting the EO/IR turret with the EO/IR turret present at a point between the multiple sides of the portable chassis, and the EO/IR turret comprising:
at least one EO/IR sensor or at least one energy emitter rotating about at least one gimbal axis relative to the portable chassis with the EO/IR turret present at the point between the multiple sides of the portable chassis, and
at least one actuator driving rotation of the at least one EO/IR sensor or at least one energy emitter about the at least one gimbal axis with the EO/IR turret present at the point between the multiple sides of the portable chassis;
positioning a self-powered portable power source on the host platform and providing power from the portable power source to operate power-consuming circuitry of the portable chassis that includes at least one of the EO/IR sensor, the energy emitter and/or the actuator with no power provided from the host platform to operate the power-consuming circuitry of the portable chassis; and
providing at least one wired or wireless output signal from the portable chassis while the portable chassis is positioned with the EO/IR turret on the host platform, the output signal communicating data from the at least one EO/IR sensor or the at least one energy emitter while the portable chassis is positioned with the EO/IR turret on the host platform with the EO/IR turret present at the point between the multiple sides of the portable chassis;

where the portable chassis and power source are movable onto and off the host platform while at the same time the portable chassis is supporting the EO/IR turret with the EO/IR turret present at the point between the multiple sides of the portable chassis.

14. The method of claim 13, where the host platform is a first host platform; and where the method further comprises then moving the portable power source and the portable chassis together with the EO/IR turret with the portable chassis supporting the EO/IR turret with the EO/IR turret present at the point between the multiple sides of the portable chassis from the first host platform to a second and different host platform that is separate from the portable chassis-; and then providing at least one wired or wireless output signal from the portable chassis while the portable chassis is positioned with the EO/IR turret on the second host platform with the EO/IR turret present at the point between the multiple sides of the portable chassis, the output signal communicating data from the at least one EO/IR sensor or the at least one energy emitter while the portable chassis is positioned with the EO/IR turret on the second host platform with the EO/IR turret present at the point between the multiple sides of the portable chassis.

15. The method of claim 14, where the first host platform is an aircraft; and where the second host platform is a ground vehicle.

16. The method of claim 13, further comprising providing at least one wireless input signal to the portable chassis while the portable chassis is positioned with the EO/IR turret on the host platform with the EO/IR turret present at the point between the multiple sides of the portable chassis, the wireless input signal communicating command data to control operation of at least one of the EO/IR sensor, energy emitter, or actuator while the portable chassis is positioned with the EO/IR turret on the host platform with the EO/IR turret present at the point between the multiple sides of the portable chassis.

17. The method of claim 16, where the providing the at least one wireless input signal to the portable chassis further comprises providing the at least one wireless input signal to the portable chassis from a location that is separate and remote from the host platform while the portable chassis is positioned with the EO/IR turret on the host platform with the EO/IR turret present at the point between the multiple sides of the portable chassis.

18. The method of claim 13, where the multiple sides of the portable chassis comprise top and bottom side walls and left and right side walls, and where the internal area of the portable chassis is defined between the top and bottom side walls and between the left and right side walls; and where the method further comprises positioning and supporting the portable chassis with a surface of the separate host platform so that at least one of the EO/IR sensor or the energy emitter has a field of view of an environment separate from the separate host platform from a position of the at least one EO/IR sensor or the at least one energy emitter to the environment separate from the separate host platform while the portable chassis is positioned with the EO/IR turret on the host platform with the EO/IR turret present at the point between the multiple sides of the portable chassis.

19. The method of claim 13, further comprising providing power from the portable power source to operate the power-consuming circuitry of the portable chassis while the portable chassis is positioned together with the EO/IR turret on the separate host platform; and at least one of:
providing at least one wired or wireless input signal to the portable chassis while the portable chassis is positioned together with the EO/IR turret on the separate host platform, the input signal communicating command data to control operation of at least one of the EO/IR sensor, energy emitter, or actuator while the portable chassis is positioned together with the EO/IR turret on the separate host platform with the EO/IR turret present at the point between the multiple sides of the portable chassis, or
receiving the at least one wired or wireless output signal from the portable chassis while the portable chassis is positioned together with the EO/IR turret on the separate host platform with the EO/IR turret present at the point between the multiple sides of the portable chassis.

20. The method of claim 13, further comprising providing power from the portable power source to operate the power-consuming circuitry of the portable chassis while the portable chassis is positioned together with the EO/IR turret on the separate host platform with the EO/IR turret present at the point between the multiple sides of the portable chassis; and at least one of:
controlling operation of the at least one EO/IR sensor, the at least one energy emitter, or the at least one actuator in response to radio frequency (RF) signals received at a radio frequency (RF) antenna integrated with the portable chassis while the portable chassis is positioned together with the EO/IR turret on the separate host platform with the EO/IR turret present at the point between the multiple sides of the portable chassis, or
receiving data from the at least one EO/IR sensor or energy emitter and transmitting the received data in RF signals from a RF antenna integrated with the portable chassis while the portable chassis is positioned together with the EO/IR turret on the separate host platform with the EO/IR turret present at the point between the multiple sides of the portable chassis.

21. The method of claim 13, further comprising providing at least one of the following at an electrical panel integrated with the portable chassis while the portable chassis is positioned together with the EO/IR turret on the separate host platform with the EO/IR turret present at the point between the multiple sides of the portable chassis:
power input for electrical circuitry of the system; input of control commands for the EO/IR sensor, energy emitter and/or actuator; output of EO/IR sensor data and/or energy emitter data; or wired communication of network data to at least one programmable integrated circuit integrated with the portable chassis.

22. The method of claim 13, further comprising providing at least one of the following at one or more input/output (I/O) devices and/or display devices that are separate and removable from the separate host platform while the portable chassis is positioned together with the EO/IR turret on the separate host platform with the EO/IR turret present at the point between the multiple sides of the portable chassis, and with the one or more I/O devices being positioned separately from the portable chassis and the EO/IR turret on the separate host platform:
receiving human user input of control commands for the EO/IR sensor, energy emitter and/or actuator, or
providing output to a human user of EO/IR sensor data and/or energy emitter data.

23. The method of claim 13, where the self-powered portable power source comprises one or more batteries integrated with the portable chassis and providing the power to operate the power-consuming circuitry of the portable chassis.

24. The method of claim 13, where the host platform is one of a stationary platform, a seaborne vehicle or a ground vehicle.

25. The method of claim 13, where the providing the at least one wired or wireless output signal from the portable chassis further comprises providing at least one wireless output signal from the portable chassis to circuitry deployed at a location that is separate and remote from the host platform while the portable chassis is positioned with the EO/IR turret on the host platform with the EO/IR turret present at the point between the multiple sides of the portable chassis.

26. A system, comprising:
  a host platform having an interior space defined within the host platform;
  a portable chassis positioned within the interior space of the host platform, the portable chassis comprising multiple sides;
  an electro-optical/infrared (EO/IR) turret present at a point between the multiple sides of the portable chassis, the EO/IR turret comprising:
    at least one EO/IR sensor or at least one energy emitter rotating about at least one gimbal axis relative to the portable chassis with the EO/IR turret present at the point between the multiple sides of the portable chassis, and
    at least one actuator driving rotation of the at least one EO/IR sensor or at least one energy emitter about the at least one gimbal axis with the EO/IR turret present at the point between the multiple sides of the portable chassis; and
  at least one wired or wireless signal output from the portable chassis, the signal output communicating data from the at least one EO/IR sensor or at least one energy emitter while the EO/IR turret is present at the point between the multiple sides of the portable chassis.

27. The system of claim 26, where the host platform comprises an aircraft, and where the interior space comprises a passenger cabin, a cargo area and/or a luggage area defined within a fuselage of the aircraft.

28. A method, comprising:
  positioning a portable chassis together with an electro-optical/infrared (EO/IR) turret within an interior space defined within a host platform that is separate from the portable chassis, the portable chassis comprising multiple sides and supporting the EO/IR turret with the EO/IR turret present at a point between the multiple sides of the portable chassis, and the EO/IR turret comprising:
    at least one EO/IR sensor or at least one energy emitter rotating about at least one gimbal axis relative to the portable chassis with the EO/IR turret present at the point between the multiple sides of the portable chassis, and
    at least one actuator driving rotation of the at least one EO/IR sensor or at least one energy emitter about the at least one gimbal axis with the EO/IR turret present at the point between the multiple sides of the portable chassis;
  providing at least one wired or wireless output signal from the portable chassis while the portable chassis is positioned with the EO/IR turret within the interior space of the host platform, the output signal communicating data from the at least one EO/IR sensor or the at least one energy emitter while the portable chassis is positioned with the EO/IR turret within the interior space of the host platform with the EO/IR turret present at the point between the multiple sides of the portable chassis;
  where the portable chassis is movable onto and off the host platform while at the same time the portable chassis is supporting the EO/IR turret with the EO/IR turret present at the point between the multiple sides of the portable chassis.

29. The method of claim 28, where the host platform comprises an aircraft, and where the interior space comprises a passenger cabin, a cargo area and/or a luggage area defined within a fuselage of the aircraft.

30. The method of claim 29, where the positioning comprises supporting the portable chassis on a floor of the passenger cabin, cargo area and/or luggage area of the fuselage interior of the aircraft, and then mechanically securing the portable chassis to at least one of seat tracks or cargo tracks that are disposed on or within the floor of the aircraft.

31. The method of claim 29, further comprising positioning a portable power source within the passenger cabin, cargo area and/or luggage area of the aircraft; and providing power from the portable power source to operate power-consuming circuitry of the portable chassis that includes at least one of the EO/IR sensor, the energy emitter and/or the actuator; where the portable power source is movable onto and off the host platform.

32. The method of claim 28, where the positioning and providing are performed without any modification to the host platform.

33. The method of claim 28, where the separate host platform comprises a first aircraft having a fuselage and a fuselage interior that defines the interior space with an opening defined in an outer wall of the fuselage between the fuselage interior and an environment outside the fuselage of the first aircraft and that is contiguous with the fuselage interior; and where the method further comprises:
  moving the portable chassis with the EO/IR turret from outside the fuselage of the first aircraft into the fuselage interior of the first aircraft through the opening in the outer wall of the fuselage of the first aircraft while at the same time the portable chassis is supporting the EO/IR turret with the EO/IR turret present at the point between the multiple sides of the portable chassis;
  then positioning the portable chassis within a passenger cabin, cargo area and/or luggage area of the fuselage interior of the first aircraft with the EO/IR turret present at the point between the multiple sides of the portable chassis so that the at least one of the EO/IR sensor or the energy emitter rotates about the at least one gimbal axis while remaining inside the fuselage with a field of view of the environment outside the fuselage that is viewable from inside the fuselage by the at least one EO/IR sensor or the at least one energy emitter while it is positioned inside the fuselage through the opening or a different opening defined in the outer wall of the fuselage of the first aircraft to the environment outside the fuselage of the first aircraft;
  then flying the first aircraft while the portable chassis is positioned within the passenger cabin, cargo area and/or luggage area of the first aircraft with the EO/IR turret present at the point between the multiple sides of the portable chassis and while at the same time at least one of:
    providing at least one wired or wireless input signal to the portable chassis while the first aircraft is airborne, the input signal communicating command data to control operation of at least one of the EO/IR sensor, energy emitter, or actuator while the portable chassis is positioned together with the EO/IR turret within the passenger cabin, cargo area and/or luggage area of the airborne first aircraft with the EO/IR turret present at the point between the multiple sides of the portable chassis, or providing the at least one wired or wireless output signal from the portable chassis while the first aircraft is airborne, the output signal communicating data from the at least one EO/IR sensor or the at least one energy emitter while the portable chassis is positioned together with the EO/IR turret within the passenger cabin, cargo area and/or luggage area of the airborne first aircraft with the EO/IR turret present at the point between the multiple sides of the portable chassis.

34. The method of claim 33, further comprising:
moving the portable chassis with the EO/IR turret from the fuselage interior of the first aircraft to outside the fuselage of the first aircraft through the opening in the outer wall of the fuselage of the first aircraft while at the same time the portable chassis is supporting the EO/IR turret with the EO/IR turret present at the point between the multiple sides of the portable chassis;
then moving the portable chassis with the EO/IR turret from outside a fuselage of a second aircraft into a fuselage interior of the second aircraft through an opening defined in the outer wall of the fuselage of the second aircraft between the fuselage interior of the second aircraft and an environment outside the fuselage of the second aircraft while at the same time the portable chassis is supporting the EO/IR turret with the EO/IR turret present at the point between the multiple sides of the portable chassis;
then positioning the portable chassis within a passenger cabin, cargo area and/or luggage area of the fuselage interior of the second aircraft with the EO/IR turret present at the point between the multiple sides of the portable chassis so that the at least one of the EO/IR sensor or the energy emitter rotates about the at least one gimbal axis while remaining inside the fuselage of the second aircraft with a field of view of the environment outside the fuselage of the second aircraft that is viewable from inside the fuselage of the second aircraft by the at least one EO/IR sensor or the at least one energy emitter while it is positioned inside the fuselage of the second aircraft through the opening or a different opening defined in the outer wall of the fuselage of the second aircraft to the environment outside the fuselage of the second aircraft;
then flying the second aircraft while the portable chassis is positioned within the passenger cabin, cargo area and/or luggage area of the second aircraft with the EO/IR turret present at the point between the multiple sides of the portable chassis and while at least one of:
providing at least one wired or wireless input signal to the portable chassis while the second aircraft is airborne, the input signal communicating command data to control operation of at least one of the EO/IR sensor, energy emitter, or actuator while the portable chassis is positioned together with the EO/IR turret on the airborne second aircraft with the EO/IR turret present at the point between the multiple sides of the portable chassis, or
providing the at least one wired or wireless output signal from the portable chassis while the second aircraft is airborne, the output signal communicating data from the at least one EO/IR sensor or the at least one energy emitter while the portable chassis is positioned together with the EO/IR turret on the airborne second aircraft with the EO/IR turret present at the point between the multiple sides of the portable chassis.

35. The method of claim 34, further comprising:
moving a portable power source from outside the fuselage of the first aircraft into the fuselage interior of the first aircraft through the opening in the outer wall of the fuselage of the first aircraft;
then positioning the portable power source within the passenger cabin, cargo area and/or luggage area of the first aircraft;
then flying the first aircraft while each of the portable chassis and portable power are positioned at the same time within the passenger cabin, cargo area and/or luggage area of the first aircraft while:
providing power from the portable power source to operate power-consuming circuitry of the portable chassis that includes at least one of the EO/IR sensor, the energy emitter and/or the actuator, and
performing the at least one of providing at least one wired or wireless input signal to the portable chassis while the first aircraft is airborne or providing the at least one wired or wireless output signal from the portable chassis while the first aircraft is airborne;
then moving the portable power source from the fuselage interior of the first aircraft to outside the fuselage of the first aircraft through the opening in the outer wall of the fuselage of the first aircraft;
then moving the portable power source from outside the fuselage of the second aircraft into the fuselage interior of the second aircraft through the opening in the outer wall of the fuselage of the second aircraft;
then positioning the portable power source within the passenger cabin, cargo area and/or luggage area of the second aircraft;
then flying the first aircraft while each of the portable chassis and portable power are positioned at the same time within the passenger cabin, cargo area and/or luggage area of the second aircraft while:
providing power from the portable power source to operate power-consuming circuitry of the portable chassis that includes at least one of the EO/IR sensor, the energy emitter and/or the actuator, and
performing the at least one of providing at least one wired or wireless input signal to the portable chassis while the second aircraft is airborne or providing the at least one wired or wireless output signal from the portable chassis while the second aircraft is airborne.

36. A method, comprising:
positioning a portable chassis together with an electro-optical/infrared (EO/IR) turret within an interior space defined within a host platform that is separate from the portable chassis, the portable chassis supporting the EO/IR turret, and the EO/IR turret comprising:
at least one EO/IR sensor or at least one energy emitter rotating about at least one gimbal axis relative to the portable chassis, and
at least one actuator driving rotation of the at least one EO/IR sensor or at least one energy emitter about the at least one gimbal axis; and
providing at least one wired or wireless output signal from the portable chassis while the portable chassis is positioned with the EO/IR turret within the interior space of the host platform, the output signal communicating data from the at least one EO/IR sensor or the at least one energy emitter while the portable chassis is positioned with the EO/IR turret within the interior space of the host platform;

where the portable chassis is movable onto and off the host platform while at the same time the portable chassis is supporting the EO/IR turret; and where the method further comprises:

positioning the portable chassis within the interior space of the separate host platform so that the at least one of the EO/IR sensor or the energy emitter rotates about the at least one gimbal axis while remaining inside the interior space of the separate host platform with a field of view of an environment outside the interior space of the separate host platform that is viewable from inside the interior space of the separate host platform by the at least one EO/IR sensor or the at least one energy emitter while it is positioned inside the interior space of the separate host platform; and at least one of:

providing at least one wired or wireless input signal communicating command data to control operation of at least one of the EO/IR sensor, energy emitter, or actuator while the portable chassis is positioned together with the EO/IR turret within the interior space of the separate host platform with the field of view of the environment outside the interior space being viewable from inside the interior space of the separate host platform by the at least one EO/IR sensor or the at least one energy emitter, or providing the at least one wired or wireless output signal from the portable chassis communicating data from the at least one EO/IR sensor or the at least one energy emitter while the portable chassis is positioned together with the EO/IR turret within the interior space of the separate host platform with the field of view of the environment outside the interior space being viewable from inside the interior space of the separate host platform by the at least one EO/IR sensor or the at least one energy emitter.

\* \* \* \* \*